United States Patent
Luo et al.

(10) Patent No.: US 12,198,588 B2
(45) Date of Patent: Jan. 14, 2025

(54) FULL-SCREEN DISPLAY METHOD AND APPARATUS, AND ELECTRONIC DEVICE

(71) Applicant: Huawei Technologies Co., Ltd., Shenzhen (CN)

(72) Inventors: Yi Luo, Shenzhen (CN); Xuan Zhou, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/919,047

(22) PCT Filed: Mar. 30, 2021

(86) PCT No.: PCT/CN2021/083860
§ 371 (c)(1),
(2) Date: Oct. 14, 2022

(87) PCT Pub. No.: WO2021/208723
PCT Pub. Date: Oct. 21, 2021

(65) Prior Publication Data
US 2023/0298498 A1    Sep. 21, 2023

(30) Foreign Application Priority Data
Apr. 15, 2020 (CN) .......................... 202010293858.7

(51) Int. Cl.
*G09G 3/00* (2006.01)
(52) U.S. Cl.
CPC ..... *G09G 3/035* (2020.08); *G09G 2340/0442* (2013.01); *G09G 2340/0492* (2013.01); *G09G 2340/145* (2013.01)
(58) Field of Classification Search
CPC ........... G09G 3/035; G09G 2340/0442; G09G 2340/0492; G09G 2340/145;
(Continued)

(56) References Cited

U.S. PATENT DOCUMENTS

2018/0176097 A1*  6/2018  Russell ................... H04L 41/22
2019/0042066 A1*  2/2019  Kim ....................... H04M 1/725
(Continued)

FOREIGN PATENT DOCUMENTS

CN    109151504 A    1/2019
CN    109814766 A    5/2019
(Continued)

OTHER PUBLICATIONS

Ouyang Rongtai Video adaptive playing method and device and storage medium Jan. 4, 2019 Shanghai Bilibili Tech Co. Ltd + CN109151504 (A) paras. 53-120, figs. 1-8 English.*
(Continued)

*Primary Examiner* — Prabodh M Dharia
(74) *Attorney, Agent, or Firm* — Conley Rose, P.C.

(57) ABSTRACT

In a full-screen display method, a multimedia file is displayed in non-full screen on an application interface; and an instruction for displaying the multimedia file in full screen is detected, and it is determined whether a window displaying the application interface is a graph whose aspect ratio is in a preset interval. If the window is a graph whose aspect ratio is in the preset interval, the multimedia file is displayed in full screen in the window based on a current display direction of the application interface, where the current display direction of the application interface includes: a display direction of the application interface obtained when the instruction for displaying the multimedia file in full screen is detected.

20 Claims, 30 Drawing Sheets

(58) Field of Classification Search
CPC .. G09G 2360/02; G09G 2380/02; G09G 5/14; G06F 3/1431; G06F 3/147; G06F 9/451
USPC ........................................................ 345/659
See application file for complete search history.

(56) References Cited

U.S. PATENT DOCUMENTS

2022/0083215 A1* 3/2022 Xia ..................... G06F 3/04842
2022/0321795 A1* 10/2022 Jiang ................... H04N 23/632

FOREIGN PATENT DOCUMENTS

| EP | 3540583 A1 | 9/2019 |
| WO | 2020000448 A1 | 1/2020 |

OTHER PUBLICATIONS

Ouyang Rongtai Video adaptive playing method and device and storage medium Jan. 4, 2019 Shanghai Bilibili Tech Co Ltd + CN109151504 (A) paras. 53-120 figs. 1-8 Chinese.*
Xu Jie Image display method and device Sep. 3, 2014 Lenovo Beijing Ltd CN104020928 (A) paras. 24-37 English.*
Xu Jie Image display method and device Sep. 3, 2014 Lenovo Beijing Ltd CN104020928 (A) paras. 24-37 Chineses.*

* cited by examiner

FULL-SCREEN DISPLAY METHOD AND APPARATUS, AND ELECTRONIC DEVICE

CROSS-REFERENCE TO RELATED APPLICATIONS

This is a U.S. National Stage of International Patent Application No. PCT/CN2021/083860 filed on Mar. 30, 2021, which claims priority to Chinese Patent 202010293858.7 filed on Apr. 15, 2020. The disclosures of the aforementioned applications are hereby incorporated by reference in their entireties.

TECHNICAL FIELD

This application relates to the field of intelligent terminal technologies, and in particular, to a full-screen display method and apparatus, and an electronic device.

BACKGROUND

All existing handheld electronic devices, such as a mobile phone and a tablet computer, have a feature of supporting rotation of an application interface. In an application, if a user expects to obtain better immersive experience in full screen, an operating system in an electronic device switches an application interface from portrait display to landscape display, and the user rotates the electronic device, to implement full-screen immersive experience. However, with development of a screen splitting technology and emergence of a foldable screen, this application interface full-screen display manner cannot fully adapt to various newly emerging scenarios in which full-screen display is required.

SUMMARY

Embodiments of this application provide a full-screen display method and apparatus, and an electronic device, to provide a better full-screen display manner for a user in various scenarios in which full-screen display is required, and improve full-screen experience of the user.

According to a first aspect, this application provides a full-screen display method, including:

displaying a multimedia file in non-full screen on an application interface; detecting an instruction for displaying the multimedia file in full screen, and determining whether a window displaying the application interface is a graph whose aspect ratio is in a preset interval, where the preset interval is an interval including 1; and if the window is a graph whose aspect ratio is in the preset interval, displaying the multimedia file in full screen in the window based on a current display direction of the application interface, where the current display direction of the application interface includes: a display direction of the application interface when the instruction for displaying the multimedia file in full screen is detected.

The foregoing application may be an application of an electronic device. The electronic device may include a device such as a mobile terminal (a mobile phone), a smart screen, an unmanned aerial vehicle, an intelligent connected vehicle (Intelligent Connected Vehicle, ICV for short below), a smart/intelligent car (smart/intelligent car), or a vehicle-mounted device. In the method, when the window displaying the application interface is a graph whose aspect ratio is in the preset interval, the application interface is displayed in full screen based on the current display direction of the application interface, and a user does not need to rotate the electronic device. In this way, a better full-screen display manner can be provided for the user in various scenarios in which full-screen display is required, and full-screen display experience of the user is improved.

The following provides several possible implementations for determining whether the window displaying the application interface is a graph whose aspect ratio is in the preset interval.

In a possible implementation, the determining whether a window displaying the application interface is a graph whose aspect ratio is in a preset interval includes: obtaining an aspect ratio of the window; and determining whether the aspect ratio is in the preset interval, where the preset interval may be [0.75, 4/3], and an upper boundary and a lower boundary of the preset interval may be an open interval or a closed interval. A principle for setting the preset interval is as follows: For a window whose aspect ratio is in the preset interval, when an application interface is displayed in a horizontal full screen and a vertical full screen, viewing experience of a user is slightly different.

In another possible implementation, a display of an electronic device that displays the application interface is a foldable screen, a complete screen in an expanded state is a graph whose aspect ratio is not in the preset interval, a sub-screen in a folded state is a graph whose aspect ratio is in the preset interval, and the display does not perform split-screen display. The determining whether a window displaying the application interface is a graph whose aspect ratio is in a preset interval includes: determining a screen used by the window; and if the screen used by the window is a sub-screen, determining that the window is a graph whose aspect ratio is in the preset interval; or if the screen used by the window is a complete screen, determining that the window is a graph whose aspect ratio is not in the preset interval.

In still another possible implementation, a display of an electronic device that displays the application interface is a foldable screen, a complete screen in an expanded state is a graph whose aspect ratio is in the preset interval, a sub-screen in a folded state is a graph whose aspect ratio is not in the preset interval, and the display does not perform split-screen display. The determining whether a window displaying the application interface is a graph whose aspect ratio is in a preset interval includes: determining a screen used by the window; and if the screen used by the window is a complete screen, determining that the window is a graph whose aspect ratio is in the preset interval; or if the screen used by the window is a sub-screen, determining that the window is a graph whose aspect ratio is not in the preset interval.

In still another possible implementation, a display of an electronic device that displays the application interface is a foldable screen, a complete screen in an expanded state is a graph whose aspect ratio is not in the preset interval, a sub-screen in a folded state is a graph whose aspect ratio is in the preset interval, and the display does not perform split-screen display. The determining whether a window displaying the application interface is a graph whose aspect ratio is in a preset interval includes: determining an open-closed state of the display; and if the open-closed state of the display is a folded state, determining that the window is a graph whose aspect ratio is in the preset interval; or if the open-closed state of the display is an expanded state, determining that the window is a graph whose aspect ratio is not in the preset interval; or if the open-closed state of the display is an open-closed changing state, determining a changing direction of the open-closed changing state of the display; and if the changing direction is from an expanded state to a folded state, determining that the window is a graph whose aspect ratio is in the preset interval; or if the changing direction is from a folded state to an expanded state, determining that the window is a graph whose aspect ratio is not in the preset interval.

In still another possible implementation, a display of an electronic device that displays the application interface is a foldable screen, a complete screen in an expanded state is a graph whose aspect ratio is in the preset interval, a sub-screen in a folded state is a graph whose aspect ratio is not in the preset interval, and the display does not perform split-screen display. The determining whether a window displaying the application interface is a graph whose aspect ratio is in a preset interval includes: determining an open-closed state of the display; and if the open-closed state of the display is an expanded state, determining that the window is a graph whose aspect ratio is in the preset interval; or if the open-closed state of the display is a folded state, determining that the window is a graph whose aspect ratio is not in the preset interval; or if the open-closed state of the display is an open-closed changing state, determining a changing direction of the open-closed changing state of the display; and if the changing direction is from a folded state to an expanded state, determining that the window is a graph whose aspect ratio is in the preset interval; or if the changing direction is from an expanded state to a folded state, determining that the window is a graph whose aspect ratio is not in the preset interval.

In a possible implementation, after the displaying the multimedia file in full screen in the window, the method further includes: detecting that the open-closed state of the display changes, and determining, based on the changing direction of the open-closed state, whether a window displaying the multimedia file after the open-closed state changes is a graph whose aspect ratio is in the preset interval; and if the window displaying the multimedia file is a graph whose aspect ratio is in the preset interval, displaying, based on a current display direction of the multimedia file, the multimedia file in full screen in the window displaying the multimedia file, where the current display direction of the multimedia file includes: a display direction of the multimedia file obtained when it is detected that the open-closed state of the display changes. Therefore, when the multimedia file is displayed in full screen in the window, it is detected that the open-closed state of the display changes. If it is determined, based on the changing direction of the open-closed state, that the window displaying the multimedia file after the open-closed state changes is a graph whose aspect ratio is in the preset interval, a user does not need to rotate the electronic device. In this way, a better full-screen display manner can be provided for the user in various scenarios in which full-screen display is required, and full-screen display experience of the user is improved.

In a possible implementation, a complete screen of the display in an expanded state is a graph whose aspect ratio is not in the preset interval, a sub-screen in a folded state is a graph whose aspect ratio is in the preset interval, and the display does not perform split-screen display. The determining, based on the changing direction of the open-closed state, whether a window displaying the multimedia file after the open-closed state changes is a graph whose aspect ratio is in the preset interval includes: determining a changing direction of the open-closed changing state of the display; and if the changing direction is from an expanded state to a folded state, determining that the window displaying the multimedia file is a graph whose aspect ratio is in the preset interval; or if the changing direction is from a folded state to an expanded state, determining that the window displaying the multimedia file is a graph whose aspect ratio is not in the preset interval. Therefore, an implementation for determining whether a window displaying a multimedia file after an open-closed state changes is a graph whose aspect ratio is in a preset interval is provided.

In a possible implementation, a complete screen of the display in an expanded state is a graph whose aspect ratio is in the preset interval, a sub-screen in a folded state is a graph whose aspect ratio is not in the preset interval, and the display does not perform split-screen display. The determining, based on the changing direction of the open-closed state, whether a window displaying the multimedia file after the open-closed state changes is a graph whose aspect ratio is in the preset interval includes: determining a changing direction of the open-closed changing state of the display; and if the changing direction is from a folded state to an expanded state, determining that the window displaying the multimedia file is a graph whose aspect ratio is in the preset interval; or if the changing direction is from an expanded state to a folded state, determining that the window displaying the multimedia file is a graph whose aspect ratio is not in the preset interval. Therefore, an implementation for determining whether a window displaying a multimedia file after an open-closed state changes is a graph whose aspect ratio is in a preset interval is provided.

In a possible implementation, the detecting an instruction for displaying the multimedia file in full screen includes: receiving a direction setting request sent by an application to which the application interface belongs, where the direction setting request is sent by the application when the application detects the instruction for displaying the multimedia file in full screen, and the direction setting request carries a display direction specified by the application for the application interface. Therefore, an implementation for detecting an instruction for displaying a multimedia file in full screen is provided.

In a possible implementation, the displaying the multimedia file in full screen in the window based on a current display direction of the application interface includes: modifying the display direction specified by the application in the direction setting request to the current display direction of the application interface; and displaying the multimedia file in full screen in the window based on a modified direction setting request. Therefore, an implementation for displaying a multimedia file in full screen in a window based on a current display direction of an application interface is provided.

According to a second aspect, an embodiment of this application provides an electronic device, including:
a display, one or more processors, a memory, and one or more computer programs, where the one or more computer programs are stored in the memory, the one or more computer programs include instructions, and when the instructions are executed by the device, the device is enabled to perform the following steps: displaying a multimedia file in non-full screen on an application interface; detecting an instruction for displaying the multimedia file in full screen, and determining whether a window displaying the application interface is a graph whose aspect ratio is in a preset interval, where the preset interval is an interval including 1; and if the window is a graph whose aspect ratio is in the preset interval, displaying the multimedia file in full screen in the window based on a current display direction of the application interface, where the current display direction of the application interface includes: a display direction of the application interface when the instruction for displaying the multimedia file in full screen is detected.

In a possible implementation, when the instructions are executed by the device, that the device is enabled to perform the step of determining whether the window displaying the application interface is a graph whose aspect ratio is in the preset interval includes: obtaining an aspect ratio of the window; and determining whether the aspect ratio is in the preset interval, where the preset interval is [0.75, 4/3].

In a possible implementation, a display of an electronic device that displays the application interface is a foldable screen, a complete screen in an expanded state is a graph whose aspect ratio is not in the preset interval, a sub-screen in a folded state is a graph whose aspect ratio is in the preset interval, and the display does not perform split-screen display. When the instructions are executed by the device, that the device is enabled to perform the step of determining whether the window displaying the application interface is a graph whose aspect ratio is in the preset interval includes: determining a screen used by the window; and if the screen used by the window is a sub-screen, determining that the window is a graph whose aspect ratio is in the preset interval; or if the screen used by the window is a complete screen, determining that the window is a graph whose aspect ratio is not in the preset interval.

In a possible implementation, a display of an electronic device that displays the application interface is a foldable screen, a complete screen in an expanded state is a graph whose aspect ratio is in the preset interval, a sub-screen in a folded state is a graph whose aspect ratio is not in the preset interval, and the display does not perform split-screen display. When the instructions are executed by the device, that the device is enabled to perform the step of determining whether the window displaying the application interface is a graph whose aspect ratio is in the preset interval includes: determining a screen used by the window; and if the screen used by the window is a complete screen, determining that the window is a graph whose aspect ratio is in the preset interval; or if the screen used by the window is a sub-screen, determining that the window is a graph whose aspect ratio is not in the preset interval.

In a possible implementation, a display of an electronic device that displays the application interface is a foldable screen, a complete screen in an expanded state is a graph whose aspect ratio is not in the preset interval, a sub-screen in a folded state is a graph whose aspect ratio is in the preset interval, and the display does not perform split-screen display. When the instructions are executed by the device, that the device is enabled to perform the step of determining whether the window displaying the application interface is a graph whose aspect ratio is in the preset interval includes: determining an open-closed state of the display; and if the open-closed state of the display is a folded state, determining that the window is a graph whose aspect ratio is in the preset interval; or if the open-closed state of the display is an expanded state, determining that the window is a graph whose aspect ratio is not in the preset interval; or if the open-closed state of the display is an open-closed changing state, determining a changing direction of the open-closed changing state of the display; and if the changing direction is from an expanded state to a folded state, determining that the window is a graph whose aspect ratio is in the preset interval; or if the changing direction is from a folded state to an expanded state, determining that the window is a graph whose aspect ratio is not in the preset interval.

In a possible implementation, a display of an electronic device that displays the application interface is a foldable screen, a complete screen in an expanded state is a graph whose aspect ratio is in the preset interval, a sub-screen in a folded state is a graph whose aspect ratio is not in the preset interval, and the display does not perform split-screen display. When the instructions are executed by the device, that the device is enabled to perform the step of determining whether the window displaying the application interface is a graph whose aspect ratio is in the preset interval includes: determining an open-closed state of the display; and if the open-closed state of the display is an expanded state, determining that the window is a graph whose aspect ratio is in the preset interval; or if the open-closed state of the display is a folded state, determining that the window is a graph whose aspect ratio is not in the preset interval; or if the open-closed state of the display is an open-closed changing state, determining a changing direction of the open-closed changing state of the display; and if the changing direction is from a folded state to an expanded state, determining that the window is a graph whose aspect ratio is in the preset interval; or if the changing direction is from an expanded state to a folded state, determining that the window is a graph whose aspect ratio is not in the preset interval.

In a possible implementation, when the instructions are executed by the device, after being enabled to display the multimedia file in full screen in the window, the device further performs the following steps: detecting that the open-closed state of the display changes, and determining, based on the changing direction of the open-closed state, whether a window displaying the multimedia file after the open-closed state changes is a graph whose aspect ratio is in the preset interval; and if the window displaying the multimedia file is a graph whose aspect ratio is in the preset interval, displaying, based on a current display direction of the multimedia file, the multimedia file in full screen in the window displaying the multimedia file, where the current display direction of the multimedia file includes: a display direction of the multimedia file obtained when it is detected that the open-closed state of the display changes.

In a possible implementation, a complete screen of the display in an expanded state is a graph whose aspect ratio is not in the preset interval, a sub-screen in a folded state is a graph whose aspect ratio is in the preset interval, and the display does not perform split-screen display. When the instructions are executed by the device, that the device is enabled to perform the step of determining, based on the changing direction of the open-closed state, whether the window displaying the multimedia file after the open-closed state changes is a graph whose aspect ratio is in the preset interval includes: determining a changing direction of the open-closed changing state of the display; and if the changing direction is from an expanded state to a folded state, determining that the window displaying the multimedia file is a graph whose aspect ratio is in the preset interval; or if the changing direction is from a folded state to an expanded state, determining that the window displaying the multimedia file is a graph whose aspect ratio is not in the preset interval.

In a possible implementation, a complete screen of the display in an expanded state is a graph whose aspect ratio is in the preset interval, a sub-screen in a folded state is a graph whose aspect ratio is not in the preset interval, and the display does not perform split-screen display. When the instructions are executed by the device, that the device is enabled to perform the step of determining, based on the changing direction of the open-closed state, whether the window displaying the multimedia file after the open-closed state changes is a graph whose aspect ratio is in the preset interval includes: determining a changing direction of the open-closed changing state of the display; and if the changing direction is from a folded state to an expanded state, determining that the window displaying the multimedia file is a graph whose aspect ratio is in the preset interval; or if the changing direction is from an expanded state to a folded state, determining that the window displaying the multimedia file is a graph whose aspect ratio is not in the preset interval.

In a possible implementation, when the instructions are executed by the device, that the device is enabled to perform the step of detecting the instruction for displaying the multimedia file in full screen includes: receiving a direction setting request sent by an application to which the application interface belongs, where the direction setting request is sent by the application when the application detects the instruction for displaying the multimedia file in full screen, and the direction setting request carries a display direction specified by the application for the application interface.

In a possible implementation, when the instructions are executed by the device, that the device is enabled to perform the step of displaying the multimedia file in full screen in the window based on the current display direction of the application interface includes: modifying the display direction specified by the application in the direction setting request to the current display direction of the application interface; and displaying the multimedia file in full screen in the window based on a modified direction setting request.

According to a third aspect, an embodiment of this application provides a computer-readable storage medium. The computer-readable storage medium stores a computer program, and when the computer program is run on a computer, the computer is enabled to perform the method according to the first aspect.

According to a fourth aspect, this application provides a computer program. When the computer program is executed by a computer, the computer program is used to perform the method according to the first aspect.

In a possible design, the program in the fourth aspect may be all or partially stored in a storage medium that is encapsulated with a processor, or may be partially or all stored in a memory that is not encapsulated with a processor.

BRIEF DESCRIPTION OF DRAWINGS

To describe the technical solutions in embodiments of the present invention more clearly, the following briefly describes the accompanying drawings required for describing the embodiments. It is clear that the accompanying drawings in the following description show merely some embodiments of the present invention, and for a person of ordinary skill in the art, other drawings may be obtained according to these drawings without creative efforts.

FIG. 4C-1 and FIG. 4C-2 are an example diagram of a full-screen display method in a split-screen display scenario:

DESCRIPTION OF EMBODIMENTS

Terms used in implementations of this application are merely used to explain specific embodiments of this application, but are not intended to limit this application.

Figure 1A:
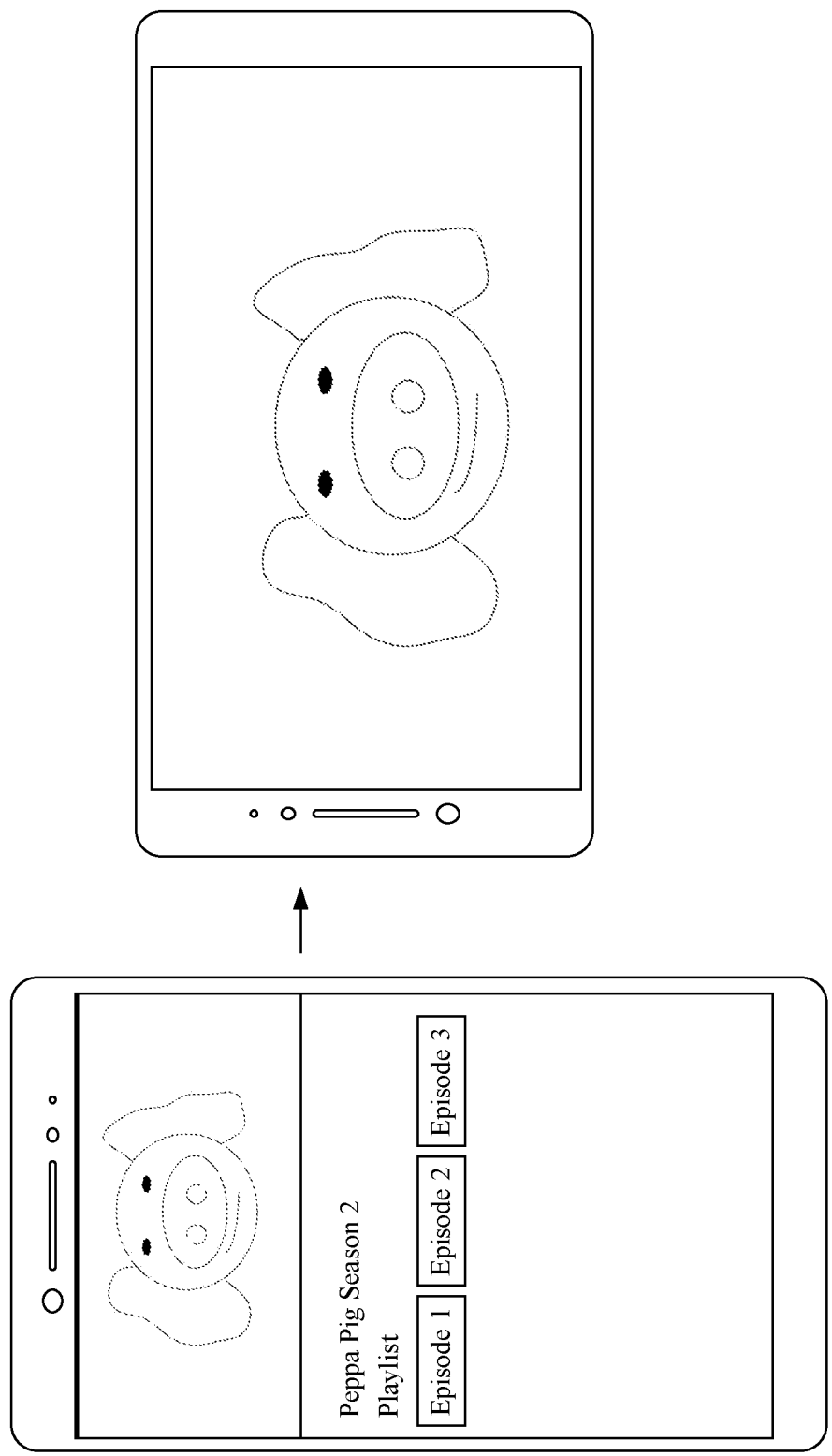
FIG. 1A is an example diagram of full-screen display of an electronic device with a rectangular screen in a current technology.

In an existing implementation solution, as shown in FIG. 1A, if a user expects to obtain better immersive experience in full screen, an operating system in an electronic device switches an application interface from portrait display to landscape display, and the user rotates the electronic device, to implement full-screen immersive experience. However, with development of technologies such as a screen splitting technology and emergence of a foldable screen, this application interface full-screen display manner cannot fully adapt to various newly emerging scenarios in which full-screen display is required.

Figure 1B:
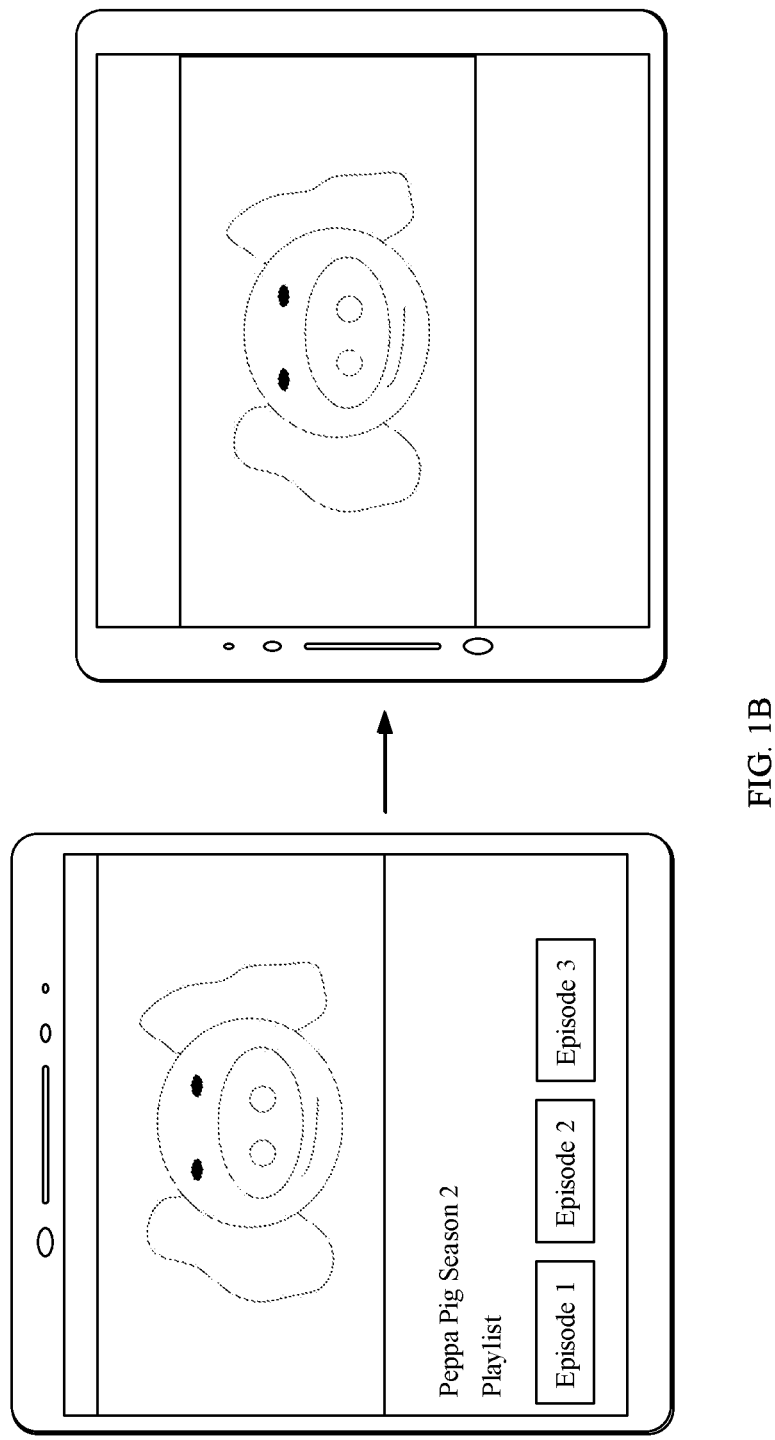
FIG. 1B is an example diagram of full-screen display of an electronic device with a square screen.

For example, with emergence of a foldable screen, a display of an electronic device is no longer a single rectangular screen. A screen whose shape is similar to a square appears, and the screen may alternatively be referred to as a square screen. As shown in FIG. 1B, when the user wants to tap a button to obtain immersive experience by enabling a video, a game, or the like to be displayed in full screen, an image is rotated, and the user rotates an electronic device for viewing. However, an electronic device with a square screen is different from an electronic device with a common rectangular screen. Due to a particularity of a square screen, whether the screen is rotated or not, an original visual area of a video image or a game image does not increase significantly. The user may find that rotating the image and the electronic device is a redundant and "thankless" operation.

Therefore, embodiments of this application provide a full-screen display method and apparatus, and an electronic device, to provide a better application interface full-screen display manner for a user in various scenarios, and provide convenient, friendly, and consistent full-screen display experience for the user.

The following first describes terms appearing in embodiments of this application by using an example.

Figure 2A:
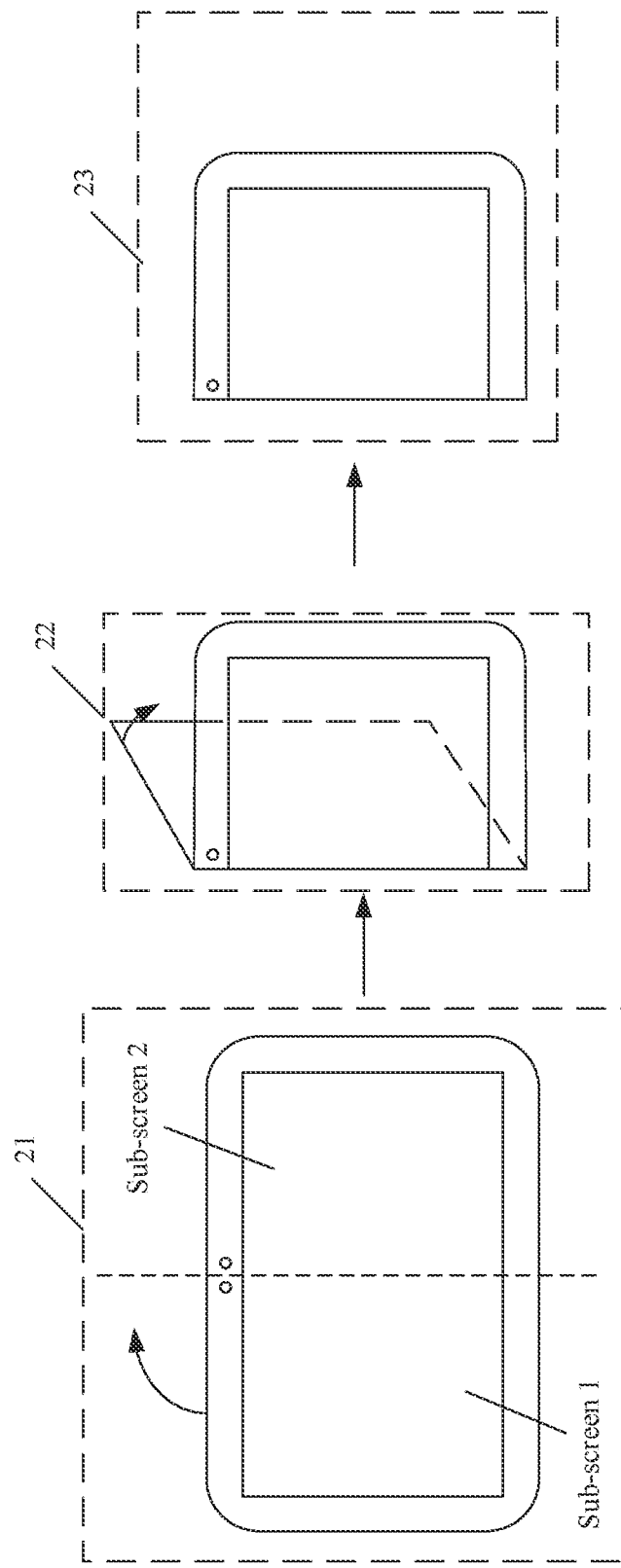
FIG. 2A is an example diagram of a status of an electronic device whose display is a foldable screen according to an embodiment of this application.

For an electronic device whose display is a foldable screen, in embodiments of this application, a screen obtained when the display is in an expanded state is referred to as a complete screen, and each independent screen forming the complete screen is referred to as a sub-screen of the display. Folded forms of the display of the electronic device may include three states: an expanded state, an incompletely folded state, and a fully folded state. As shown in FIG. 2A, a display of an electronic device includes two sub-screens, and the two sub-screens are respectively a sub-screen 1 and a sub-screen 2 that are located on two sides of a dashed line. When the electronic device is in an expanded state shown in part 21 in FIG. 2A, the two sub-screens form a complete screen. As shown in part 22 in FIG. 2A, the electronic device is in an incompletely folded state. As shown in part 23 in FIG. 2A, the electronic device is in a fully folded state. The incompletely folded state and the fully folded state may be collectively referred to as a folded state.

The application interface in embodiments of this application is a medium interface for interaction and information exchange between an application and a user, and implements conversion between an internal form of information and a form that can be accepted by the user. A common representation form of an application interface is a graphical user interface (graphic user interface, GUI for short below). The graphical user interface refers to a user interface that is related to a computer operation and that is displayed in a graphical manner. An application interface may include visual interface elements such as an icon, a button, a menu, a tab, a text box, a dialog box, a status bar, a navigation bar, and a widget (widget).

In embodiments of this application, a window displaying an application interface may be considered as an area that is on a display of an electronic device and in which the application interface is displayed.

For an electronic device whose display is not a foldable screen, when screen splitting is not performed, a window that displays an application interface may be an entire display area of the display; or when screen splitting is performed, a window that displays an application interface may be a part of a display area of the display.

For an electronic device whose display is a foldable screen, when screen splitting is not performed, a window displaying an application interface may be an entire display area of a complete screen or an entire display area of a sub-screen. When screen splitting is performed, a window displaying an application interface may be a part of a display area of a complete screen or a part of a display area of a sub-screen.

Figure 2B:
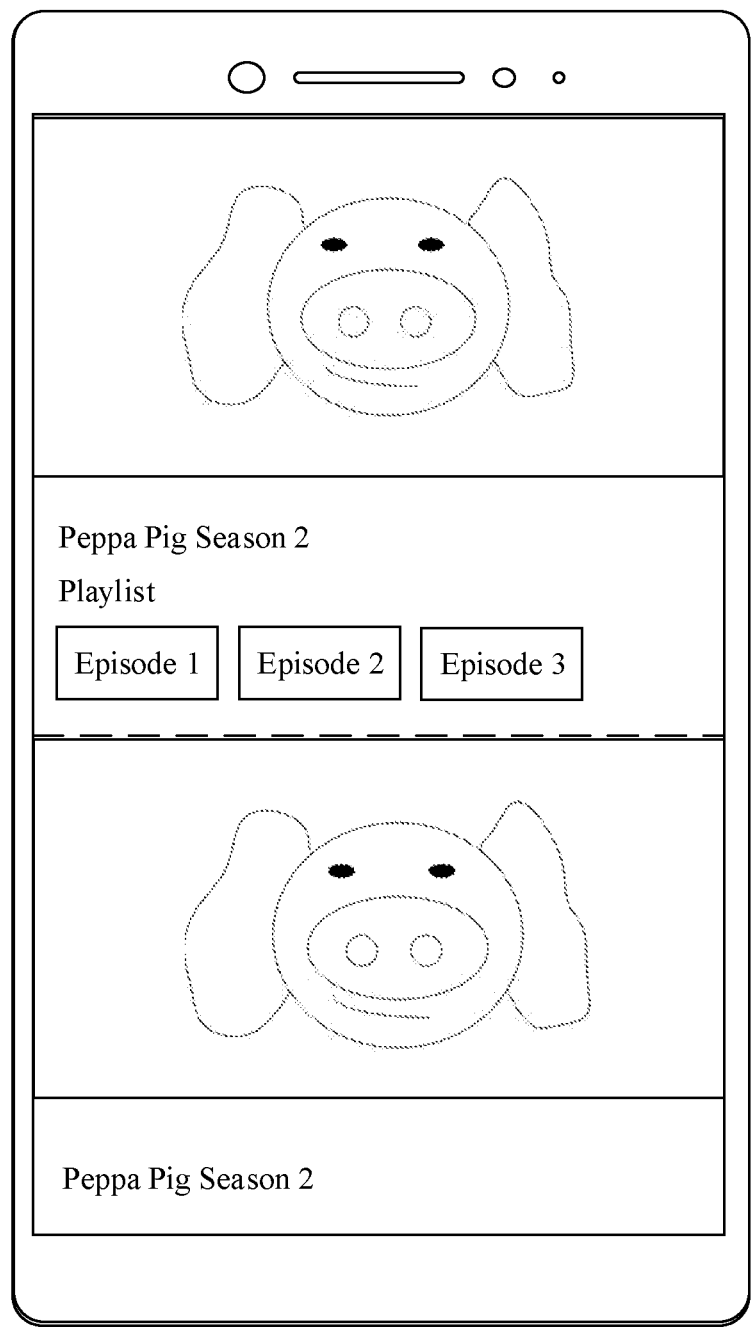
FIG. 2B is an example diagram of screen splitting according to an embodiment of this application.

Screen splitting in embodiments of this application means that a display area of a display is divided into at least two sub-areas, and each sub-area may be used as a window to display an application interface. A size of a sub-area may be adjusted, and different sub-areas may display a same application interface or different application interfaces. As shown in FIG. 2B, a display area on a display of an electronic device is divided into two sub-areas from a part indicated by a dashed line, and the two sub-areas are respectively used as windows to display a same application interface. For an electronic device whose display is a foldable screen, during screen splitting, a display area on which screen splitting is performed may be a complete screen or a sub-screen. For details, refer to the foregoing descriptions and the example in FIG. 2B. Details are not described herein again.

Figure 2C:
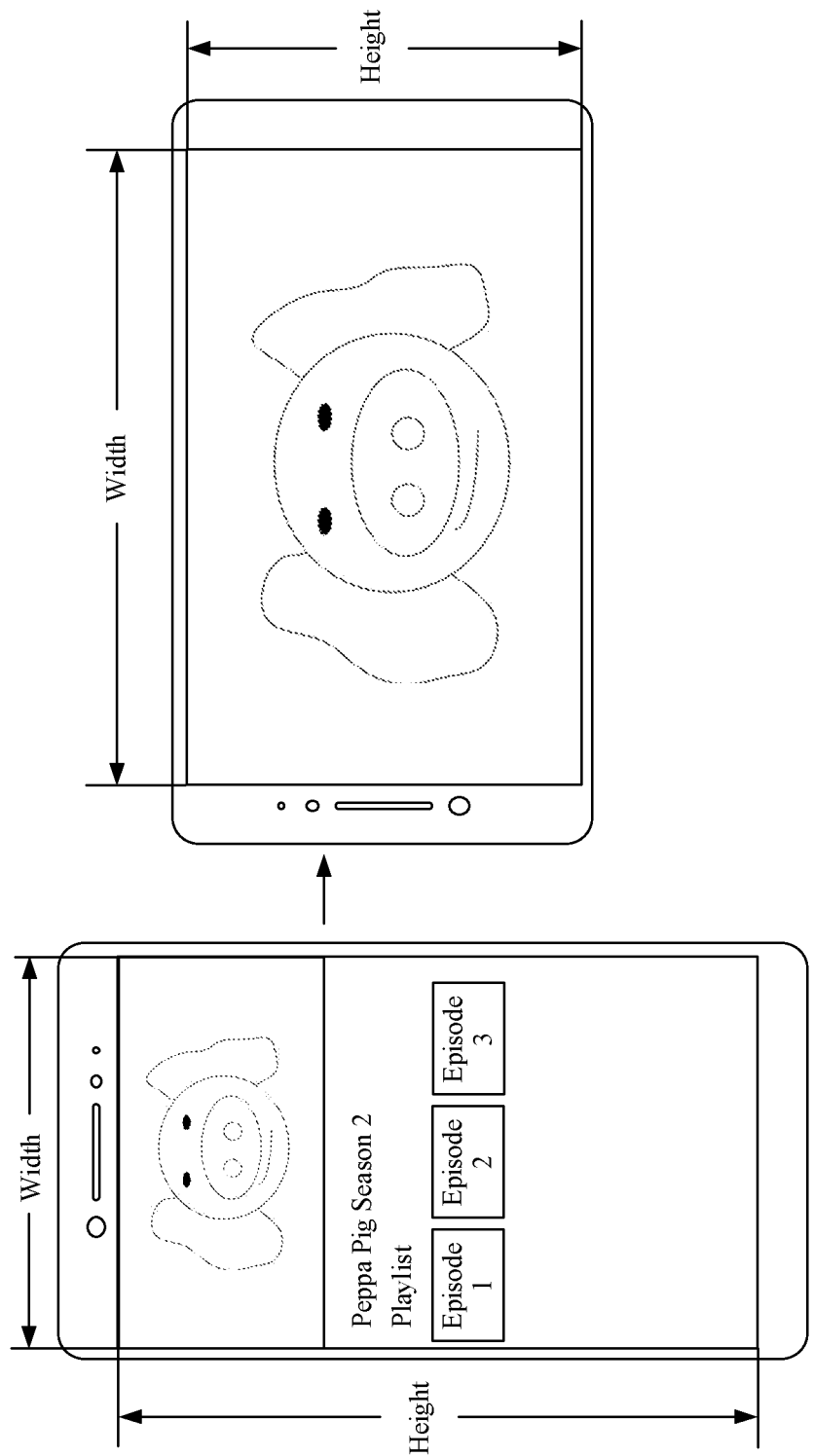
FIG. 2C is an example diagram of a height and a width of a window according to an embodiment of this application.

In embodiments of this application, an aspect ratio of a window means a height of the window/a width of the window. However, the height and the width of the window are related to a specific setting rule. For example, in a possible implementation, it may be set that a height and a width of a window are related to a display direction of an application interface. For example, in two figures in FIG. 2C, windows displaying an application interface are both entire display areas of displays. However, a height and a width of the window displaying the application interface in the left figure of FIG. 2C are exactly opposite to a height and a width of the window displaying the application interface in the right figure, and aspect ratios of the two windows are reciprocal. In a subsequent embodiment of a full-screen display method of this application, an aspect ratio of a window obtained according to the rule for setting a height and a width of a window is used as an example for description. In another possible implementation, a height and a width of a window may not be related to a display direction of an application interface, so that an aspect ratio of a same window remains unchanged. For example, in FIG. 2C, regardless of whether a display direction of the application interface is a direction shown in the left figure or the right figure, an aspect ratio of the windows may be always set to the height/width shown in the left figure of FIG. 2C.

Figure 2D:
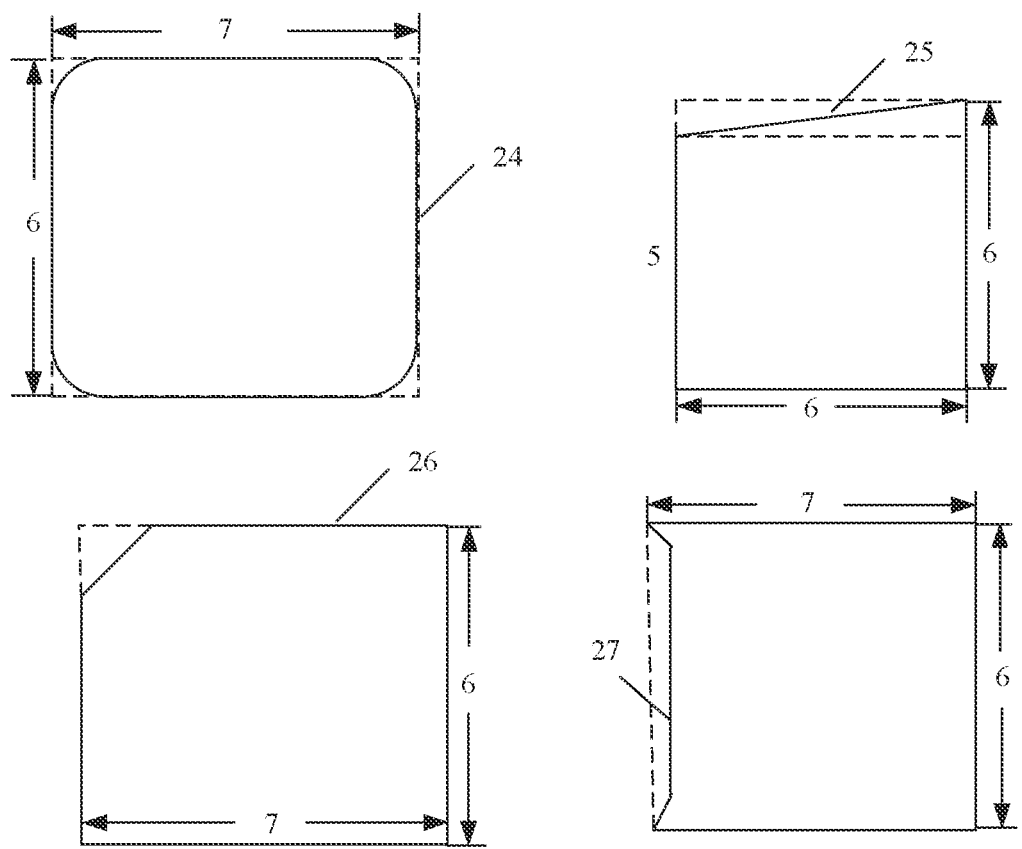
FIG. 2D is an example diagram of a possible implementation shape of an irregular graph.

In embodiments of this application, a graph whose aspect ratio is in a preset interval includes a square and a graph whose shape is similar to a square. A principle for setting the preset interval is as follows: For a window whose aspect ratio is in the preset interval, when an application interface is displayed in a horizontal full screen and a vertical full screen, viewing experience of a user is slightly different. Optionally, the preset interval may be an interval including 1, and an upper boundary and a lower boundary of the preset interval are close to 1. For example, the preset interval may be [6/8, 8/6], that is, [0.75, 4/3]. The foregoing uses a closed interval as an example. An upper boundary and a lower boundary of the preset interval may alternatively be an open interval. The graph whose shape is similar to a square may be a regular graph or an irregular graph. A regular graph whose shape is similar to a square may include a rectangle whose height-width ratio is in the preset interval, and the like. As shown in a solid line part in FIG. 2D, an example of an irregular graph whose shape is similar to a square is provided. For a graph 24, a length-width ratio of the graph is 7:6, and four corners are all arcs in shape. For a graph 25, a length-width ratio of the graph is 6:6 or 6:5. For a graph 26, a length-width ratio of the graph is 7:6, but one corner is lost. For a graph 27, a length-width ratio of the graph is 7:6, but a shape of one edge is lost. Graphs shown in FIG. 2D are merely examples, and are not used to limit a graph whose shape is similar to a square in this application. A person skilled in the art may foresee more graphs whose shapes are similar to a square. For example, in each example, there may be different length-width ratios close to 1. In the graph 24, a quantity of corners whose shapes are arcs may be different; and in the graph 26 and the graph 27, a quantity of lost corners or lost edges may be different, a lost shape may change, and the like. Details are not described herein.

The following describes the full-screen display method in embodiments of this application by using an example.

Figure 3A:
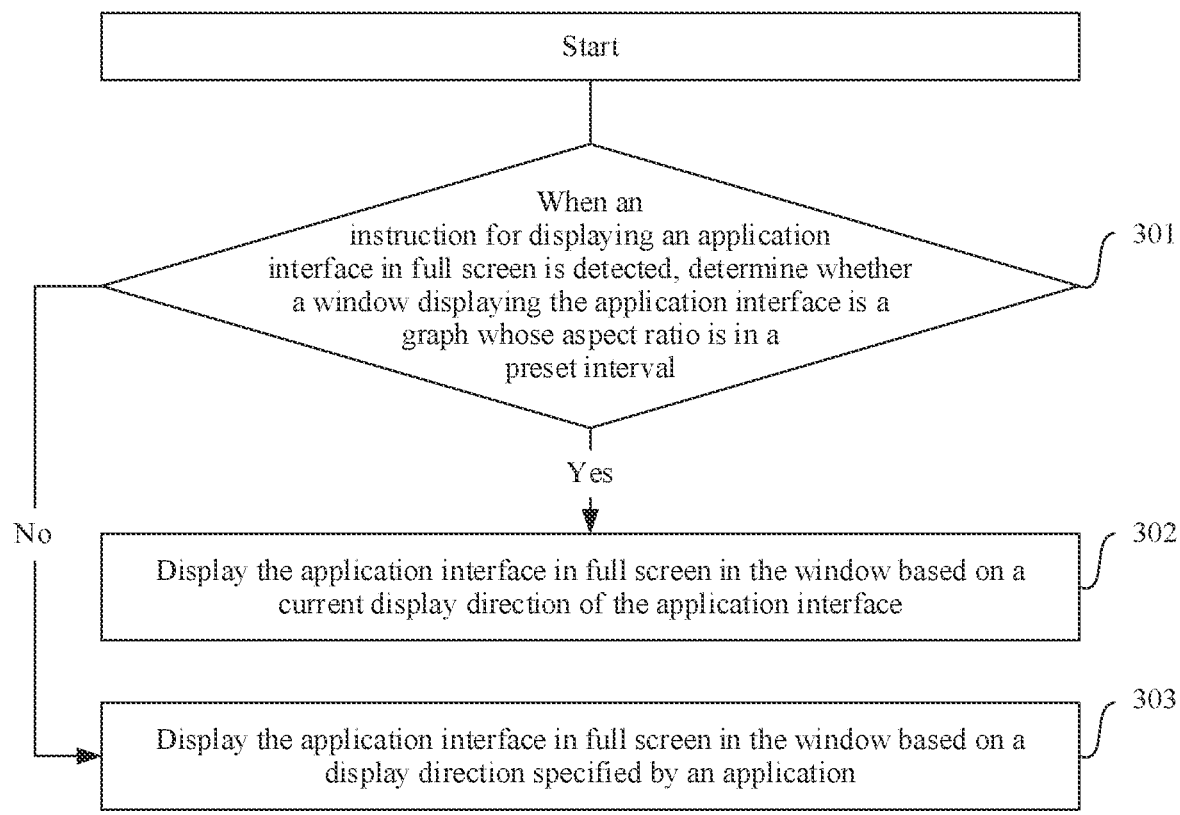
FIG. 3A is a flowchart of an embodiment of a full-screen display method according to this application.

FIG. 3A is a flowchart of an embodiment of a full-screen display method according to this application. As shown in FIG. 3A, the method may include the following steps.

Step 301: When an instruction for displaying an application interface in full screen is detected, determine whether a window displaying the application interface is a graph whose aspect ratio is in a preset interval, where the preset interval is an interval including 1, and if the window is a graph whose aspect ratio is in the preset interval, step 302 is performed, or if the window is a graph whose aspect ratio is not in the preset interval, step 303 is performed.

A scenario in which the instruction for displaying the application interface in full screen is detected includes but is not limited to the following.

Figure 3B:
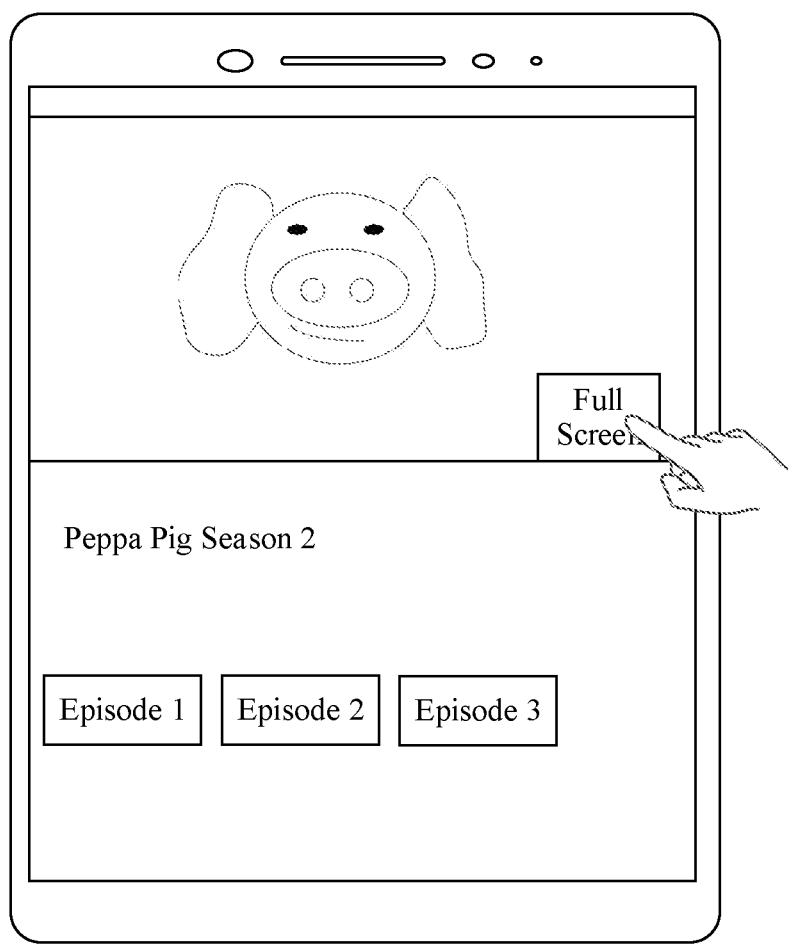
FIG. 3B is an example diagram in which a user taps a full-screen button to start an application interface in full screen according to an embodiment of this application.
Figure 3C:
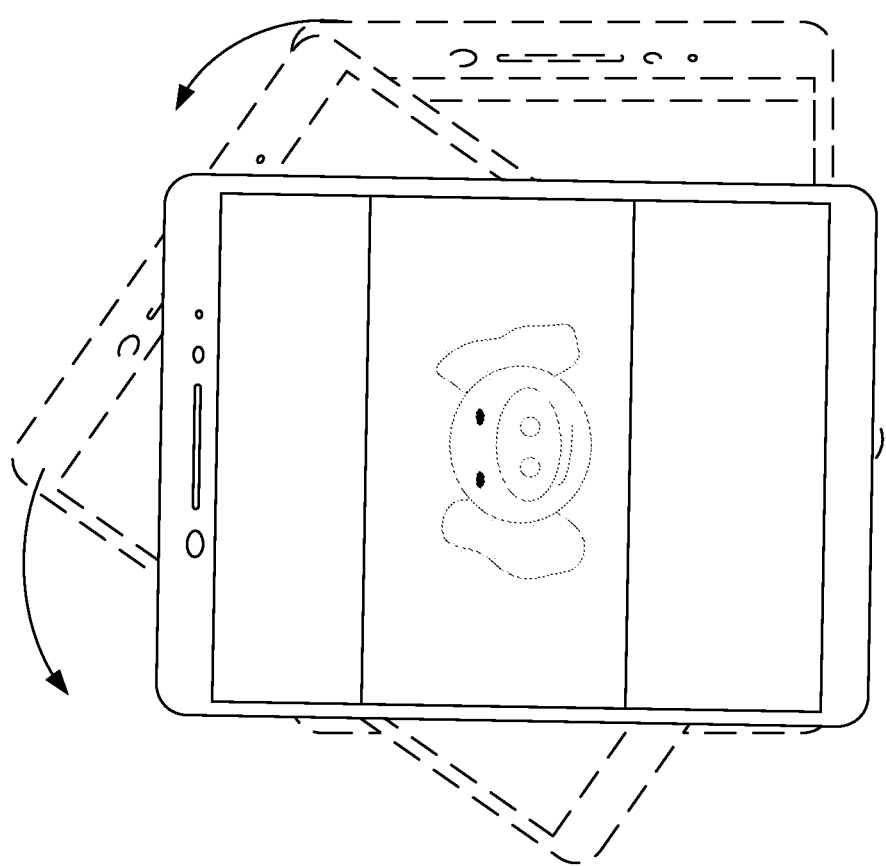
FIG. 3C is an example diagram in which a user rotates an electronic device to start an application interface in full screen according to an embodiment of this application.

A full-screen instruction for an application interface is obtained. For example, a user delivers a full-screen instruction to an application by tapping a full-screen button on the application interface or performing a preset gesture operation on the application interface. Alternatively, an application triggers, during running, a full-screen instruction carried by the application. For example, for playing of a multimedia file such as a video or a picture, the user may usually click a full-screen button (as shown in FIG. 3B) or rotate an electronic device (as shown in FIG. 3C) to deliver an instruction for playing the multimedia file in full screen. For a mobile game, a startup item of the game generally includes a full-screen instruction for a game interface. Therefore, when the application, that is, the mobile game, is started, the full-screen instruction may be obtained from the startup item.

Alternatively, an application interface is already displayed in full screen, but it is detected that a window displaying the application interface in full screen changes, and the application interface needs to continue to be displayed in full screen in a changed window. A reason why the window changes may include but is not limited to the following: A window displaying the application interface changes in terms of a direction, a shape, a size, and the like because of a change in an open-closed state of a display, split-screen display of the display, or the like.

Step 302: Display the application interface in full screen in the window based on a current display direction of the application interface, to end this branch process.

The current display direction of the application interface refers to a display direction of the application interface obtained when the instruction for displaying the application interface in full screen is detected.

Step 303: Display the application interface in full screen in the window based on a display direction specified by the application, to end this branch process.

Figure 3D:
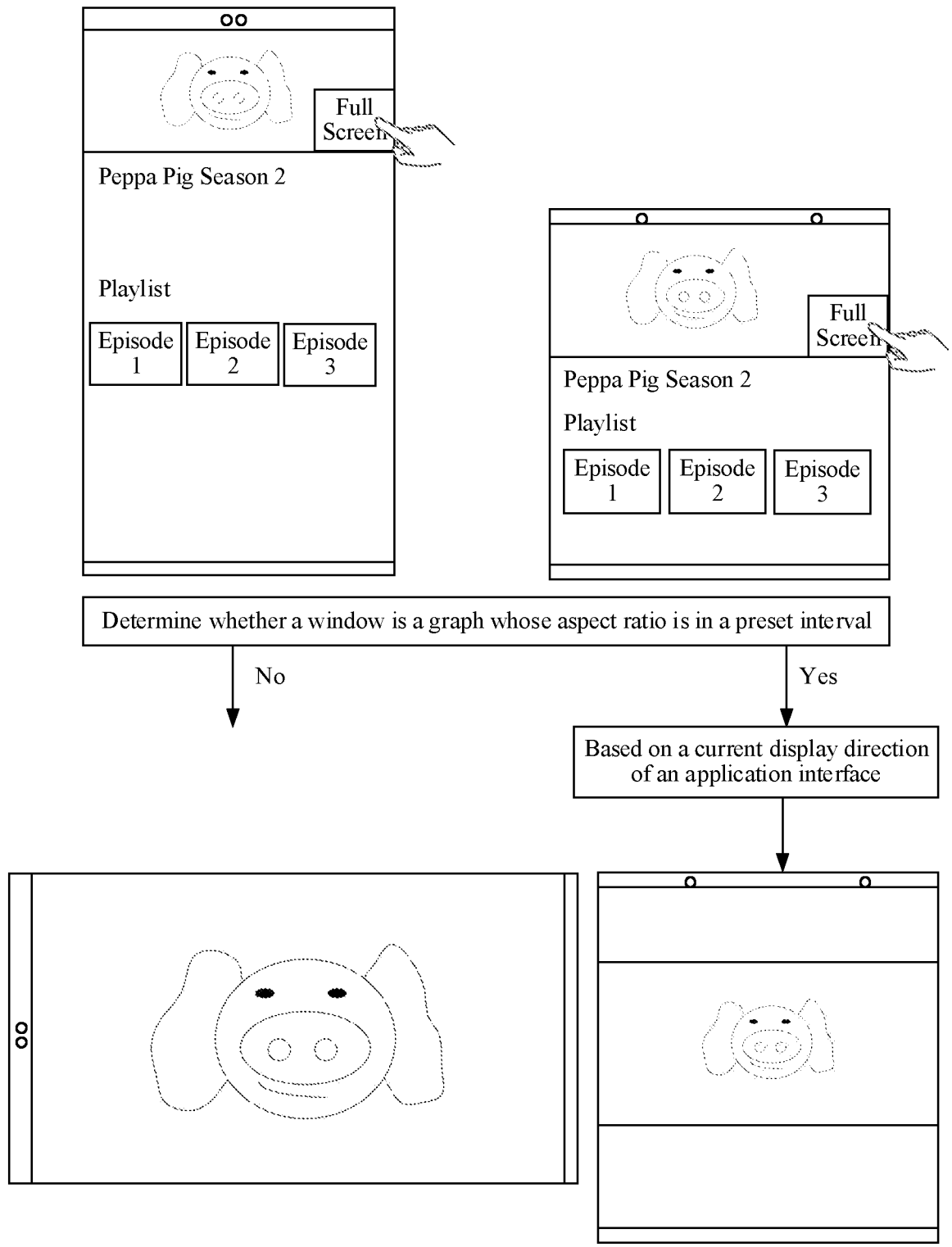
FIG. 3D is an example diagram of a multimedia file full-screen display method according to an embodiment of this application.
Figures 1, 3E:
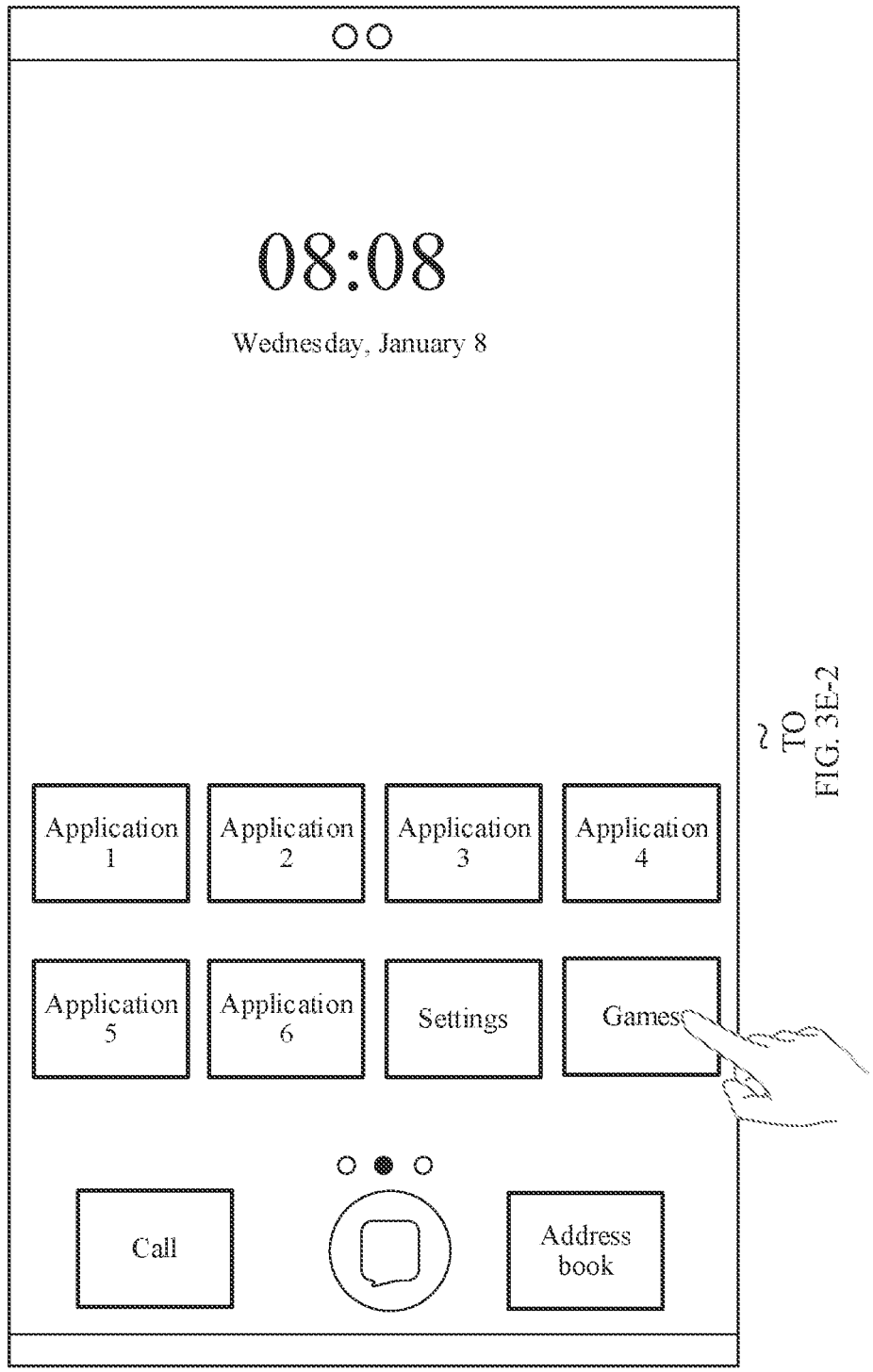
FIG. 3E-1 to FIG. 3E-3 are an example diagram of a method for displaying a game interface in full screen according to an embodiment of this application.
Figures 2, 3E:
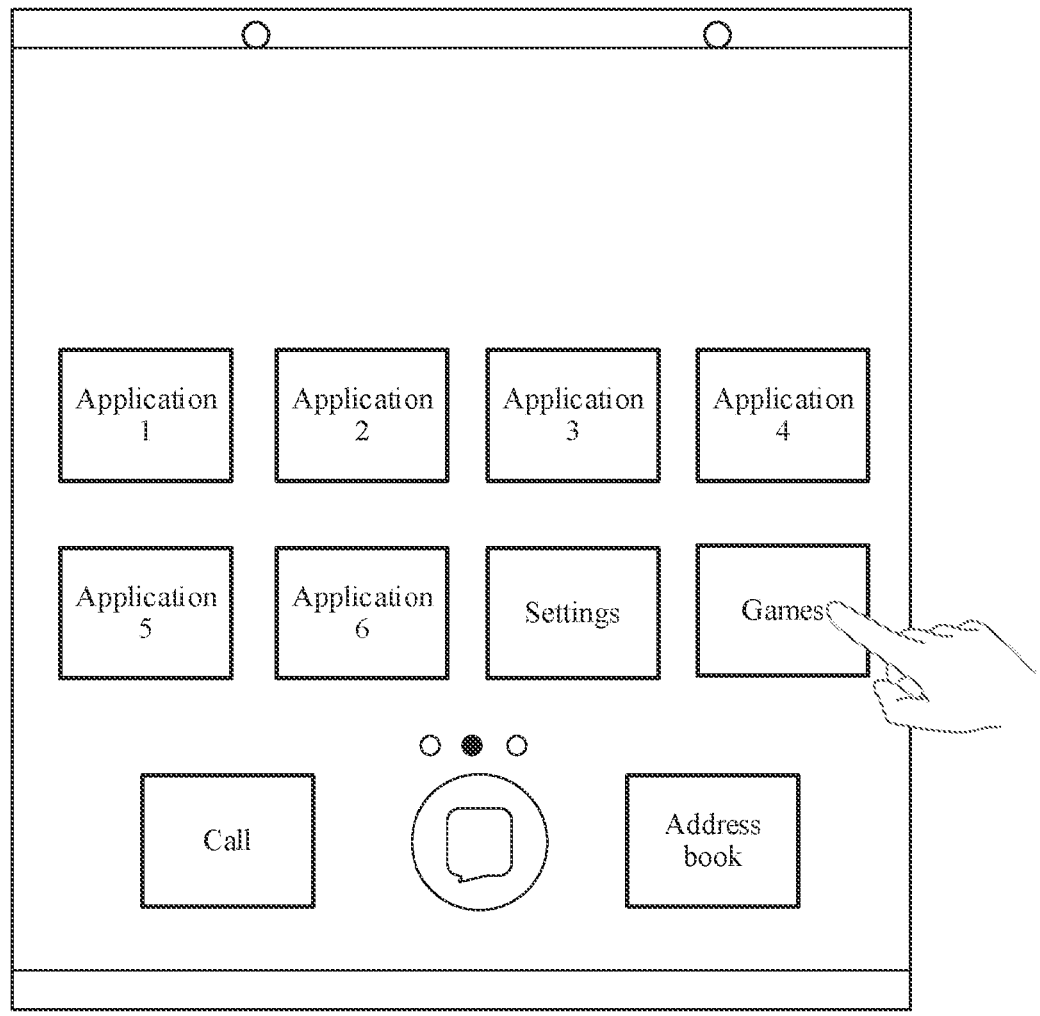
Figures 3, 3E:
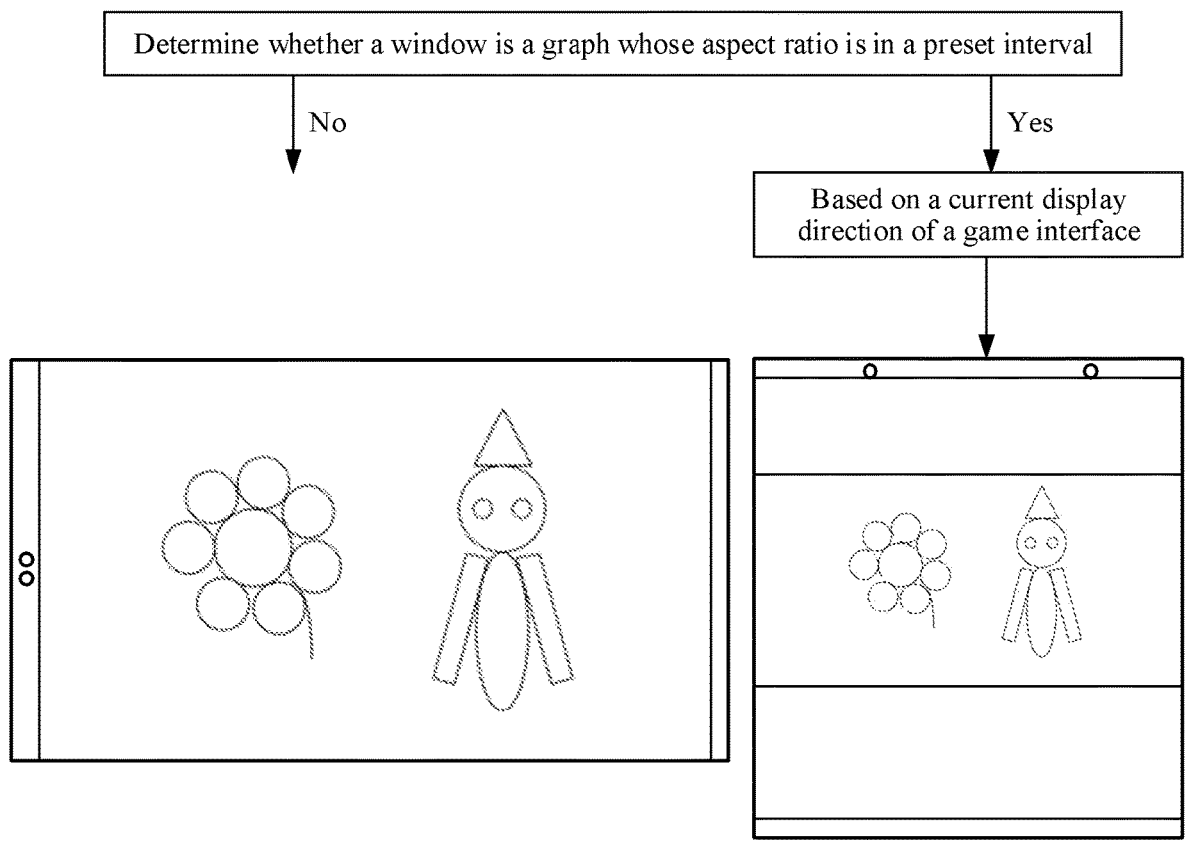

According to the method shown in FIG. 3, when the window displaying the application interface is a graph whose aspect ratio is in the preset interval, the application interface is displayed in full screen based on the current display direction of the application interface, and the user does not need to rotate the electronic device. In this way, in a scenario in which a window displaying an application interface is a graph whose aspect ratio is in a preset interval, a better full-screen display manner is provided for a user, and full-screen experience of the user is improved.

A multimedia file full-screen display method is described based on the embodiment shown in FIG. 3A. As shown in an upper left figure and an upper right figure in FIG. 3D, a multimedia file is displayed in non-full screen on an application interface of an electronic device. In FIG. 3D, an example in which the multimedia file is a video is used. If a user taps a full-screen button when watching the multimedia file, correspondingly, the electronic device detects a full-screen instruction for the multimedia file (that is, detects an instruction for displaying the application interface in full screen), and determines whether a window displaying the application interface is a graph whose aspect ratio is in the preset interval.

If a determining result is that the window is a graph whose aspect ratio is in the preset interval, correspondingly, as shown in the lower right figure, a direction of the multimedia file (the video in FIG. 3D) does not need to be rotated, and based on a current display direction of the application interface, the multimedia file (the video in FIG. 3D) is displayed in full screen in the window.

If a determining result is that the window is a graph whose aspect ratio is not in the preset interval, correspondingly, as shown in the lower left figure, the multimedia file is displayed in full screen in the window after a direction of the application interface is rotated based on a display direction specified by the application.

A game full-screen display method is described based on the embodiment shown in FIG. 3A. As shown in FIG. 3E-1 and FIG. 3E-2, a user taps an icon of a game-type application to start the game, and the application obtains a full-screen instruction of a game interface from a startup item during startup. Correspondingly, the electronic device detects a full-screen instruction for an application interface (that is, detecting an instruction for displaying the application interface in full screen), and determines whether a window displaying the application interface is a graph whose aspect ratio is in the preset interval.

If a determining result is that the window is a graph whose aspect ratio is in the preset interval, correspondingly, as shown in the right figure in FIG. 3E-3, a direction of the game interface does not need to be rotated, and based on a current display direction of the game interface, the game interface is displayed in full screen in the window.

If a determining result is that the window is a graph whose aspect ratio is not in the preset interval, correspondingly, as shown in the left figure in FIG. 3E-3, the game interface is displayed in full screen in the window after a direction of the game interface is rotated based on a display direction specified by the game.

Figure 4A:
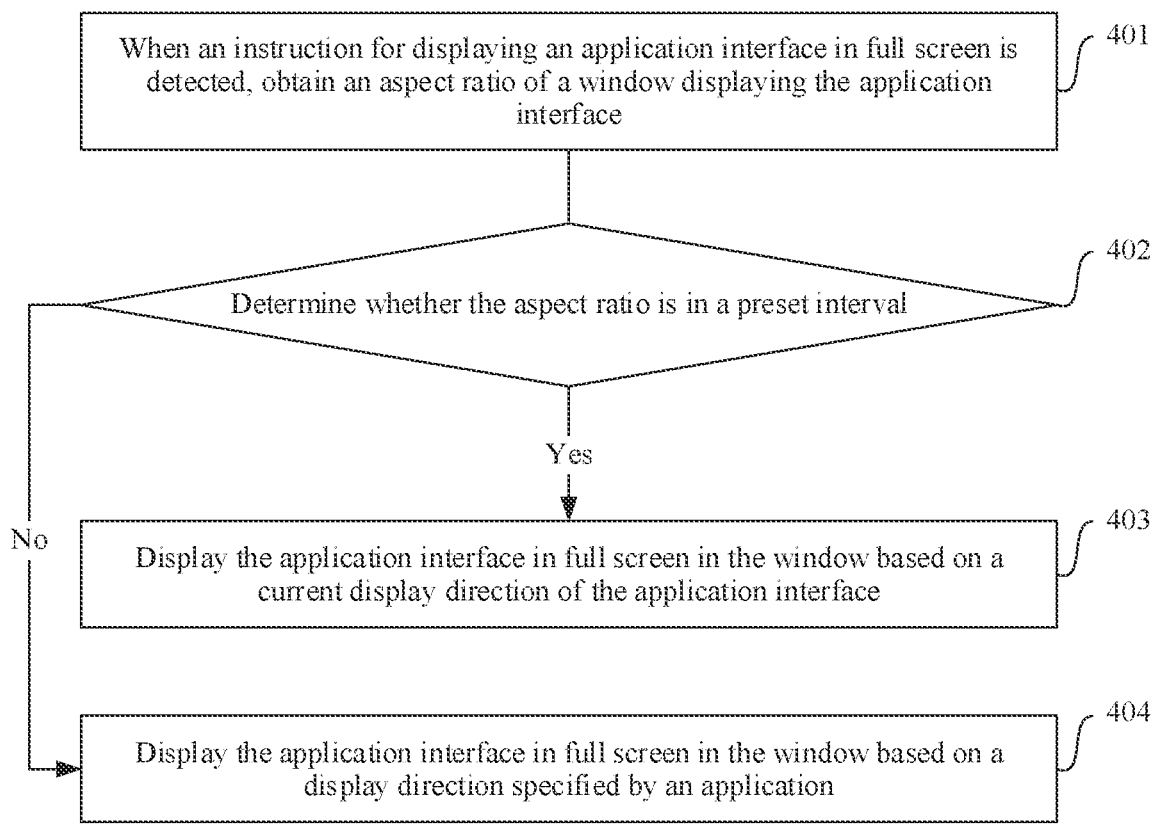
FIG. 4A is a flowchart of another embodiment of a full-screen display method according to this application.

FIG. 4A is a flowchart of another embodiment of a full-screen display method according to this application. FIG. 4A provides a possible implementation for determining whether a window displaying an application interface is a graph whose aspect ratio is in a preset interval. As shown in FIG. 4A, the method may include the following steps.

Step 401: When an instruction for displaying an application interface in full screen is detected, obtain an aspect ratio of a window displaying the application interface.

In actual application, a height value and a width value of the window may be obtained respectively, and the aspect ratio of the window is obtained through calculation of the height/width; or if a parameter of the aspect ratio of the window is preset, the aspect ratio of the window may be obtained by obtaining the parameter.

Step 402: Determine whether the aspect ratio is in a preset interval, and if the aspect ratio is in the preset interval, perform step 403; or if the aspect ratio is not in the preset interval, perform step 404.

For setting of the preset interval, refer to the foregoing related descriptions. Details are not described herein again.

Step 403: Display the application interface in full screen in the window based on a current display direction of the application interface, to end this branch process.

Step 404: Display the application interface in full screen in the window based on a display direction specified by an application, to end this branch process.

In the method shown in FIG. 4A, determining, based on the aspect ratio of the window, whether the window is a graph whose aspect ratio is in the preset interval is irrelevant to various existence states of a display in an electronic device. For example, the display may be a foldable screen or a non-foldable screen. If the display is a foldable screen, the display may be in a folded state, an expanded state, or a changing state between a foldable state and an expanded state; and the display may be in a split-screen display state, or may be in a non-split-screen display state, or the like.

According to the method shown in FIG. 4A, whether the window is a graph whose aspect ratio is in the preset interval is determined by determining whether the aspect ratio of the window is in the preset interval.

Figure 4B:
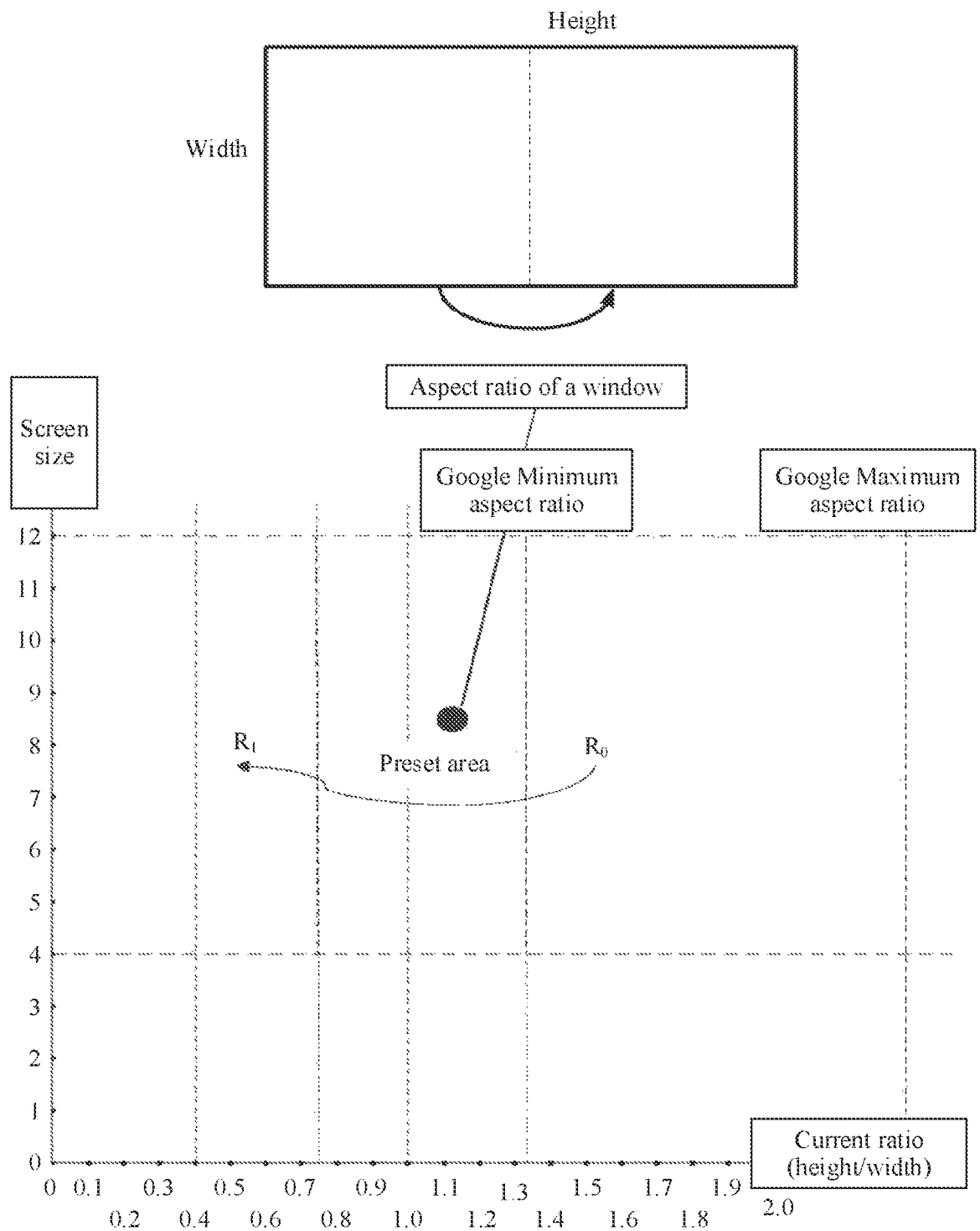
FIG. 4B is an example diagram of a full-screen display method in a foldable screen scenario.

Based on the embodiment in FIG. 4A, an example in which a display is a rectangular foldable screen without screen splitting is used. FIG. 4B describes a diagram of a relationship between a change in an aspect ratio of a window obtained before and after the display is folded and a full-screen display direction. As shown in the figure, R0 is an aspect ratio of the window obtained before the display is folded, and R1 is an aspect ratio of the window obtained after the display is folded. If R1 falls in the preset interval, the window is displayed based on a current display direction of an application interface, and the display direction of the application interface does not need to be rotated. If R1 falls outside the preset interval, the window is displayed based on a display direction specified by an application, and a display direction of the application interface usually needs to be rotated.

Figure 4C:
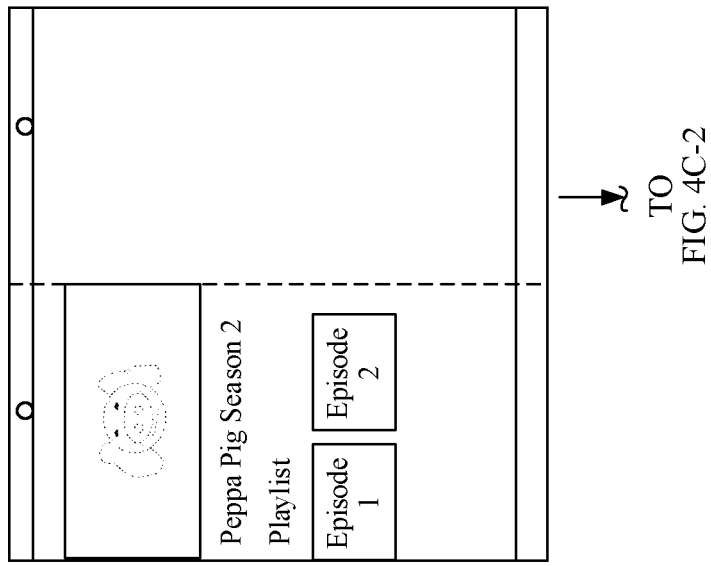
Figure 1:
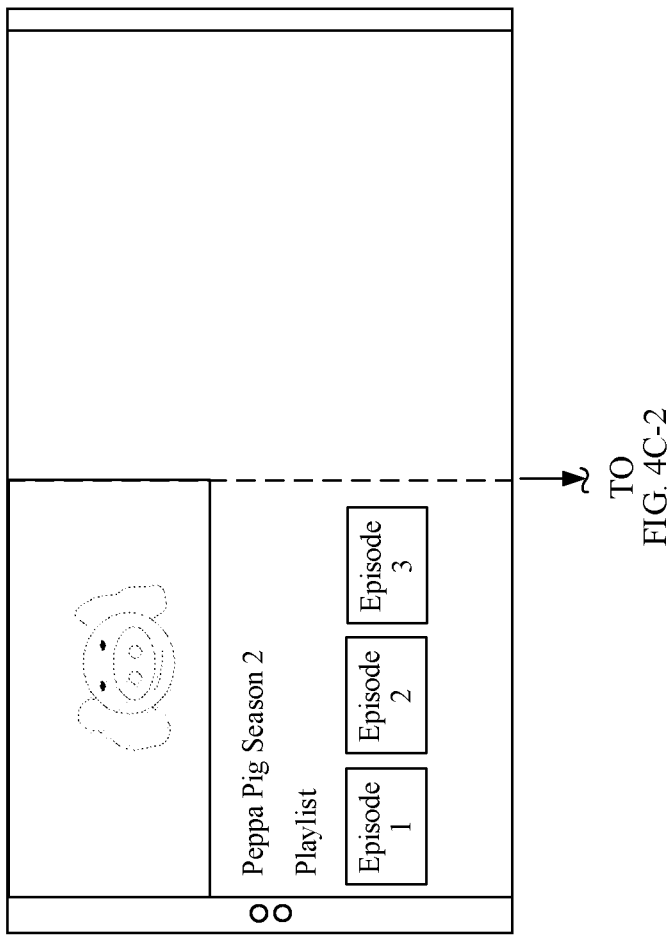
Figures 2, 4C:
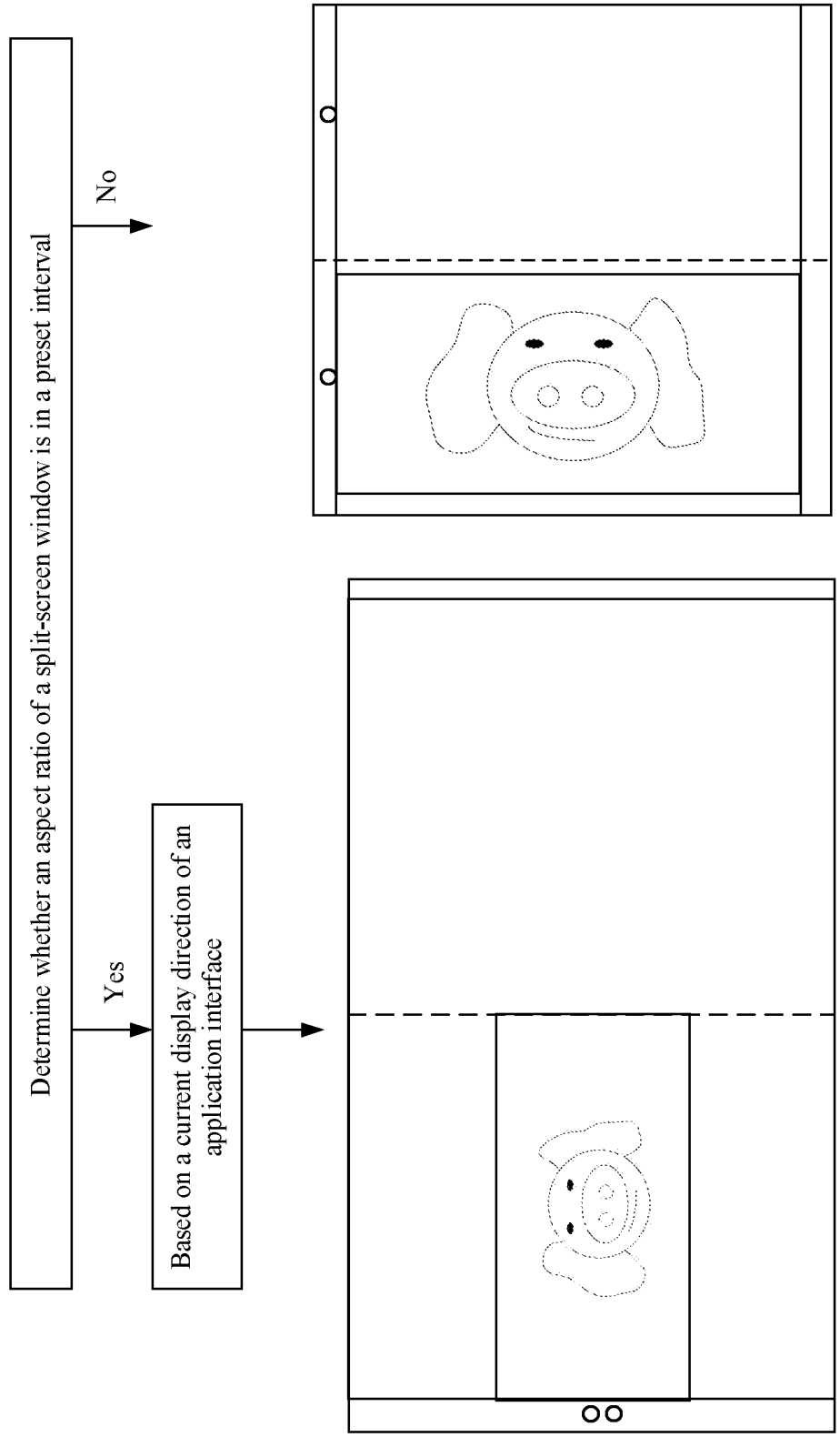

As shown in FIG. 4C-1 and FIG. 4C-2, an example in which a display is in a split-screen display state is used to describe the embodiment shown in FIG. 4A in comparison. In left figures in FIG. 4C-1 and FIG. 4C-2, the display may be a foldable screen or a non-foldable screen. If the display is a foldable screen, the display may be in an expanded state or a folded state. A key is that each split-screen window on the display is a graph whose aspect ratio is in the preset interval. In right figures in FIG. 4C-1 and FIG. 4C-2, the display may be a foldable screen or a non-foldable screen. If the display is a foldable screen, the display may be in an expanded state or a folded state. A key is that each split-screen window on the display is a graph whose aspect ratio is not in the preset interval.

A multimedia file (a video is used as an example in the figure) is being played in a split-screen window on the left in an upper-left-corner figure. If a user taps a full-screen button on an application interface to deliver a full-screen instruction, it is determined whether an aspect ratio of the split-screen window is in the preset interval. Because the split-screen window is a graph whose aspect ratio is in the preset interval, a determining result is that the aspect ratio is in the preset interval. Therefore, in the lower-left-corner diagram, the multimedia file is displayed in full screen based on a current display direction of the application interface.

A multimedia file (a video is used as an example in the figure) is being played in a split-screen window on the left in an upper-right-corner figure. If a user taps a full-screen button on an application interface to deliver a full-screen instruction, it is determined whether an aspect ratio of the split-screen window is in the preset interval. Because the split-screen window is a graph whose aspect ratio is not in the preset interval, a determining result is that the aspect ratio is not in the preset interval. Therefore, in the lower-right-corner diagram, the multimedia file is displayed in full screen after a direction of the multimedia file is rotated based on a display direction specified by the application.

In actual application, if a display does not perform split-screen display, a window displaying an application interface generally overlaps a complete display area of a screen to which the window belongs. In other words, the window displaying the application interface is the complete display area of the screen to which the window belongs. When a shape and a size of the screen are known, an aspect ratio of the window does not need to be obtained. As long as it is known whether the screen is a graph whose aspect ratio is in a preset interval, it can be determined whether the window is a graph whose aspect ratio is in the preset interval. If the display is not a foldable screen, the screen herein refers to the display. If the display is a foldable screen, the screen herein may be a complete screen of the display or a sub-screen of the display. According to this principle, this application further provides embodiments shown in FIG. 5A to FIG. 10A. Descriptions are provided below one by one.

Figure 5A:
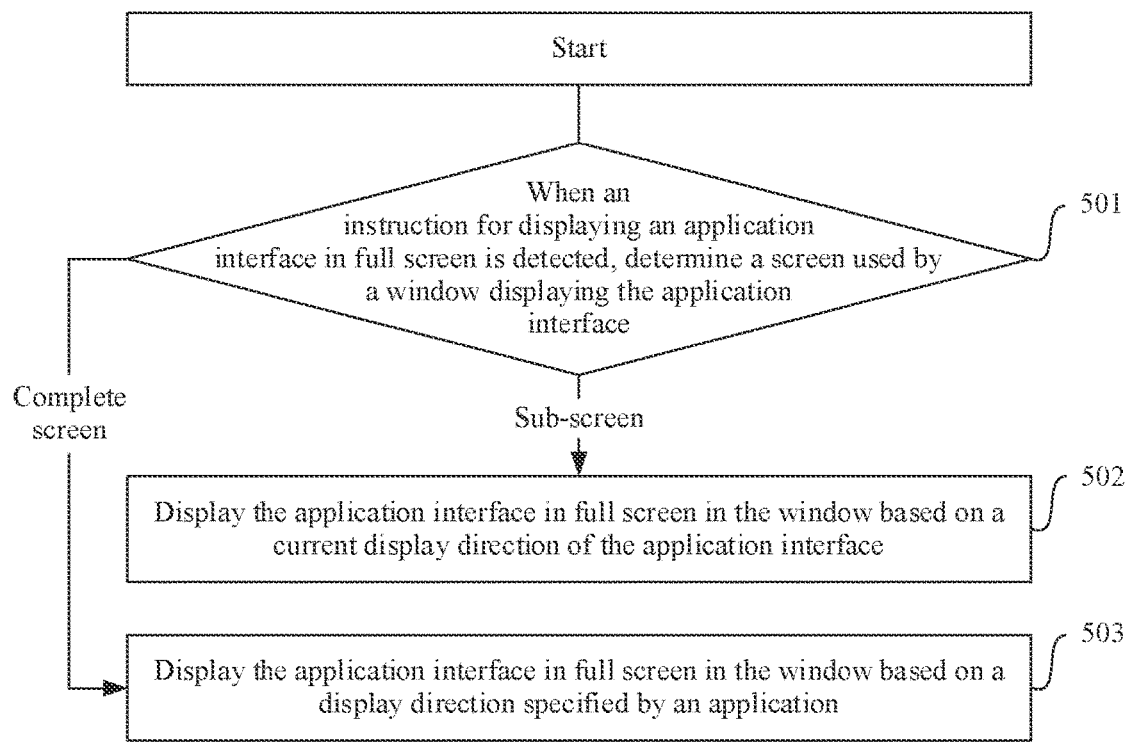
FIG. 5A is a flowchart of yet another embodiment of a full-screen display method according to this application.

FIG. 5A is a flowchart of still another embodiment of a full-screen display method according to this application.

Figure 5B:
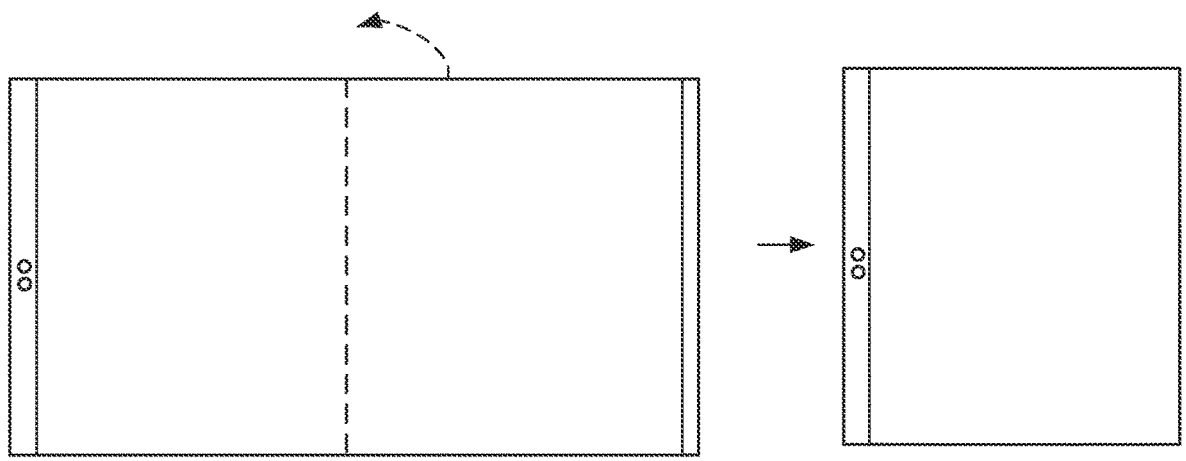
FIG. 5B is a schematic diagram of a structure and a shape of a display.

In this embodiment, a display is a foldable screen, and the display does not perform split-screen display. In a folded state, a sub-screen is a graph whose aspect ratio is in a preset interval; and in an expanded state, a complete screen is a graph whose aspect ratio is not in the preset interval. FIG. 5B is an example diagram of a fully folded state and an expanded state of the display that are obtained when the display includes two sub-screens.

As shown in FIG. 5A, the method may include the following steps.

Step 501: When an instruction for displaying an application interface in full screen is detected, determine a screen used by a window displaying the application interface; and if the used screen is a sub-screen, perform step 502; or if the used screen is a complete screen, perform step 503.

Step 502: Display the application interface in full screen in the window based on a current display direction of the application interface, to end this branch process.

Step 503: Display the application interface in full screen in the window based on a display direction specified by an application, to end this branch process.

In a possible implementation, if the display in this embodiment performs split-screen display, and the display performs split-screen display by using each sub-screen as a split screen, the application interface is displayed on a sub-screen, and the sub-screen is a graph whose aspect ratio is in the preset interval. In this case, before the step of determining, when the instruction for displaying the application interface in full screen is detected, the screen used by the window displaying the application interface, the method may further include: determining whether the display performs split-screen display; and if the display does not perform split-screen display, performing the step of determining the screen used by the window displaying the application interface; or if the display performs split-screen display, performing step 502.

Figure 5C:
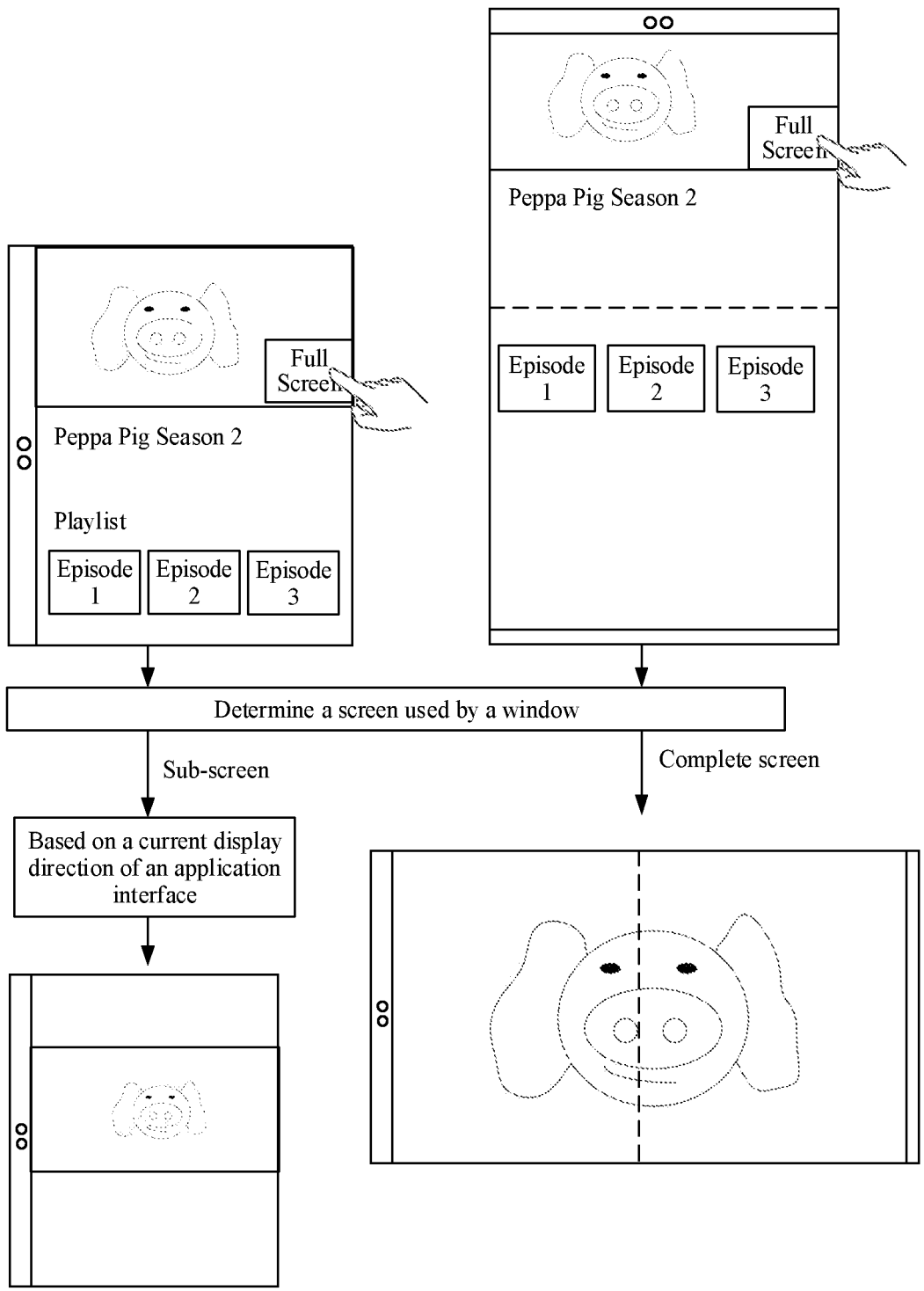
FIG. 5C is an example diagram of a full-screen display method according to this application.

FIG. 5C is an example diagram of the embodiment shown in FIG. 5A. In an upper-left figure, a user taps a full-screen button when watching a video on a sub-screen. According to the method in FIG. 5A, it is determined that a used screen is a sub-screen. Correspondingly, as shown in a lower left diagram, the video is displayed in full screen on the sub-screen based on a current display direction of a video playing interface.

In an upper-right figure, the user taps a full-screen button when watching a video on a complete screen. According to the method in FIG. 5A, it is determined that a used screen is a complete screen. Correspondingly, as shown in a lower-right diagram, the video is displayed in full screen after a direction of a video playing interface is rotated.

Figure 6:
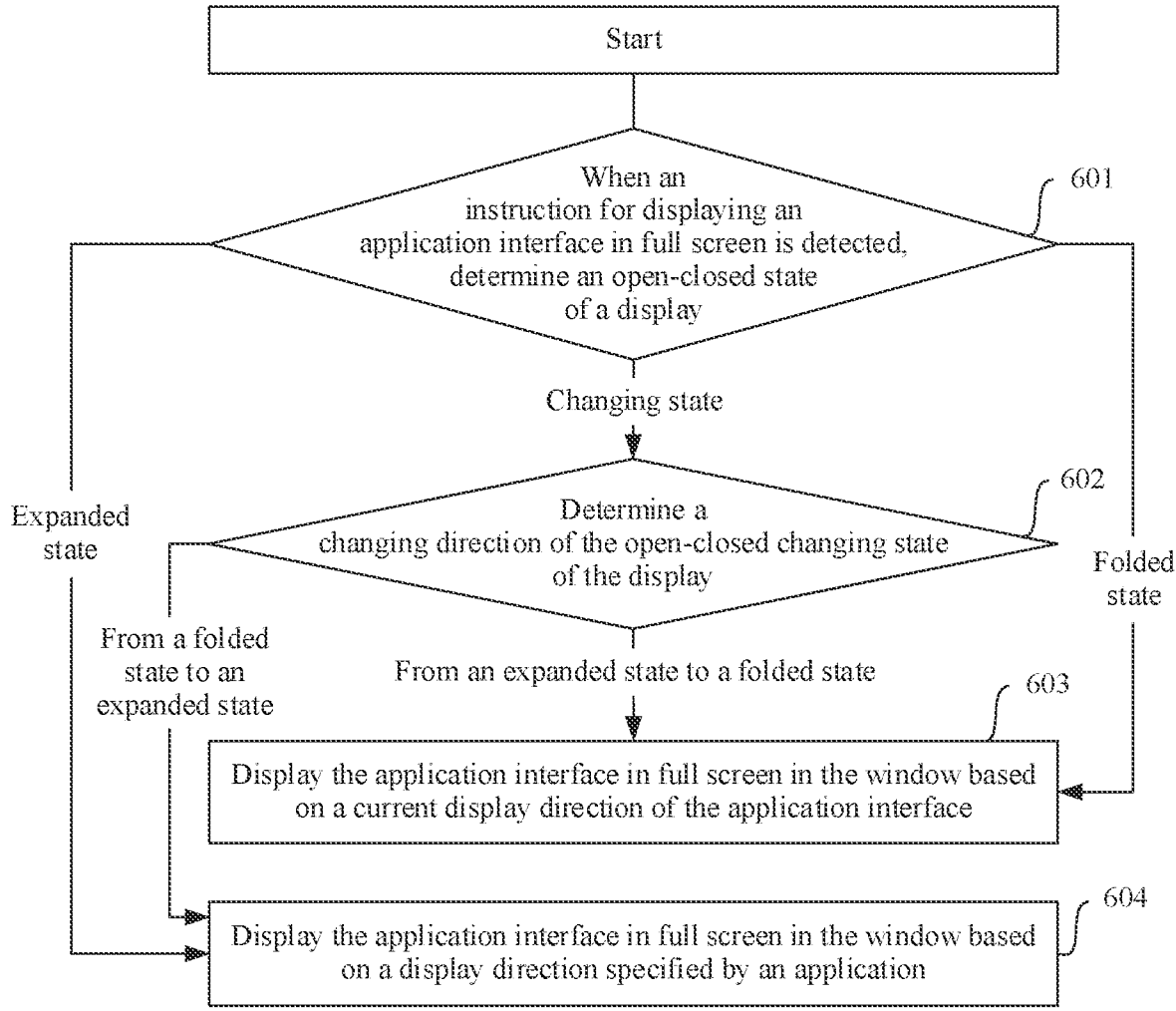
FIG. 6 is a flowchart of still another embodiment of a full-screen display method according to this application.

FIG. 6 is a flowchart of still another embodiment of a full-screen display method according to this application.

In this embodiment, a display is a foldable screen, and the display does not perform split-screen display. In a folded state, a sub-screen is a graph whose aspect ratio is in a preset interval; and in an expanded state, a complete screen is a graph whose aspect ratio is not in the preset interval. For an example of the display, refer to FIG. 5B. Details are not described herein again.

The display does not perform split-screen display. Therefore, when the display is in a folded state, one sub-screen in the display displays an application interface: when the display is in an expanded state, the complete screen displays the application interface; when the state of the display changes from a folded state to an expanded state, the complete screen displays the application interface; and when the state of the display changes from an expanded state to a folded state, one sub-screen displays the application interface. The folded state herein may be an incompletely folded state or a fully folded state. In actual application, a specific sub-screen displaying the application interface is not limited in this application.

In this case, as shown in FIG. 6, the method may include the following steps.

Step 601: When an instruction for displaying an application interface in full screen is detected, determine an open-closed state of a display; and if the open-closed state of the display is a folded state, perform step 603; or if the open-closed state of the display is an expanded state, perform step 604; or if the open-closed state of the display is an open-closed changing state, perform step 602.

Step 602: Determine a changing direction of the open-closed state of the display; and if the changing direction is from an expanded state to a folded state, perform step 603; or if the changing direction is from a folded state to an expanded state, perform step 604.

Step 603: Display the application interface in full screen in the window based on a current display direction of the application interface, to end this branch process.

Step 604: Display the application interface in full screen in the window based on a display direction specified by an application, to end this branch process.

In a possible implementation, if the display in this embodiment performs split-screen display, and the display performs split-screen display by using each sub-screen as a split screen, the application interface is displayed on a sub-screen, and the sub-screen is a graph whose aspect ratio is in the preset interval. In this case, before the step of determining the open-closed state of the display when the full-screen instruction for the application interface is detected, the method may further include: determining whether the display performs split-screen display; and if the display does not perform split-screen display, performing the step of determining the open-closed state of the display; or if the display performs split-screen display, performing step 603.

Figure 7A:
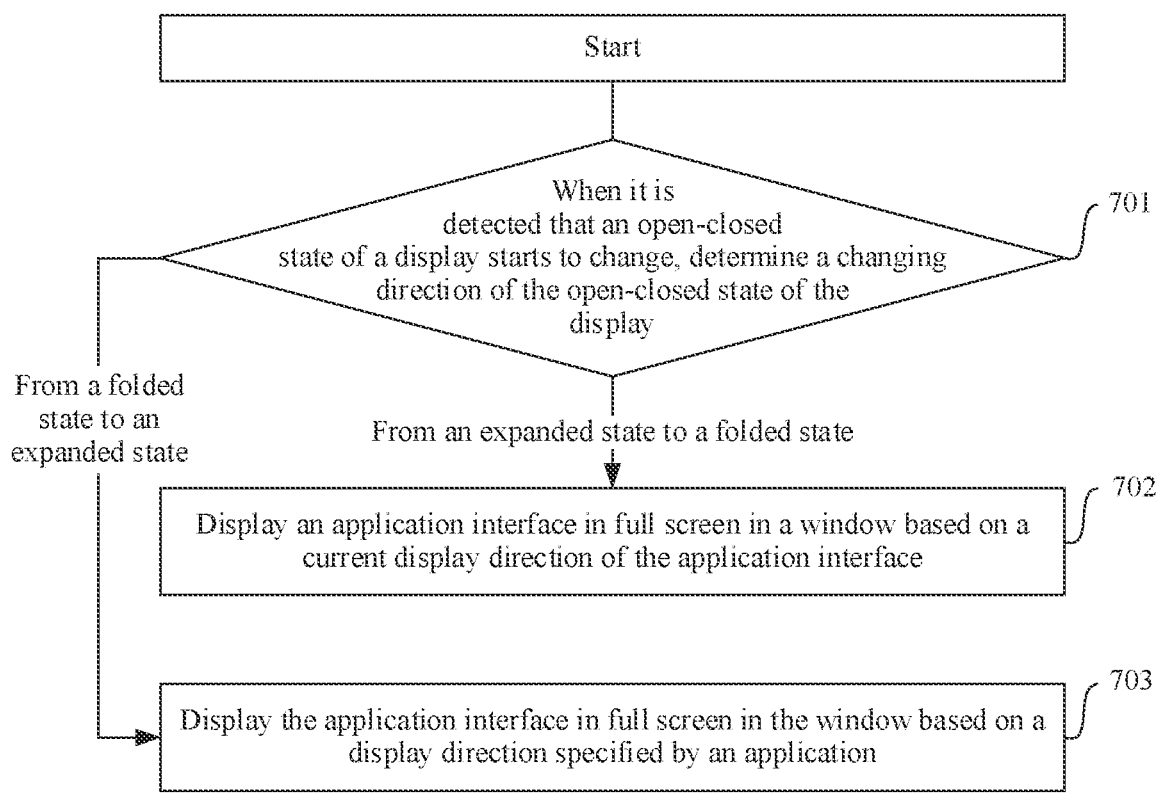
FIG. 7A is a flowchart of still another embodiment of a full-screen display method according to this application.
Figure 7B:
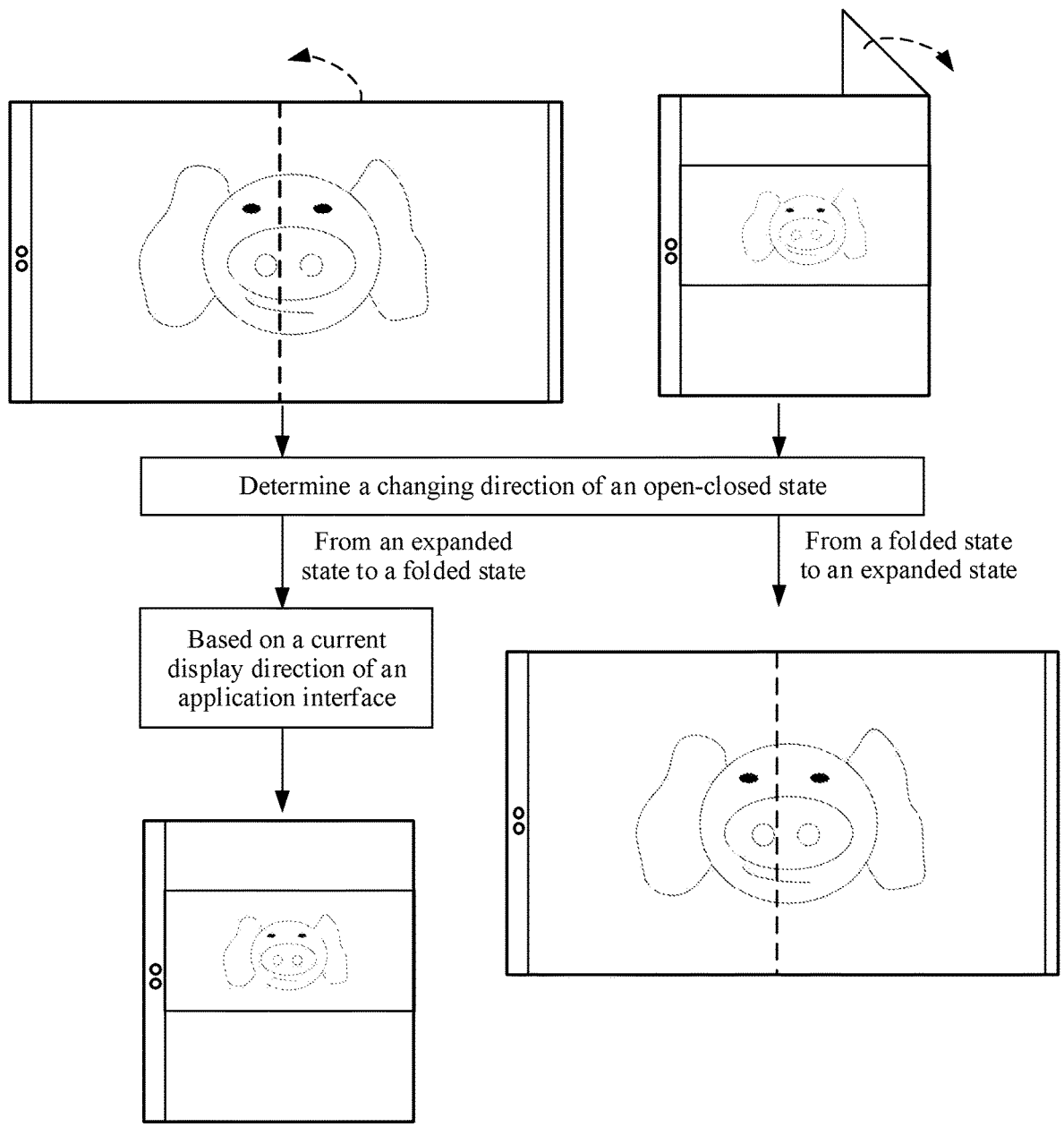
FIG. 7B is another example diagram of a full-screen display method according to this application.

For an example in FIG. 6, refer to FIG. 5B and FIG. 7B. Details are not described herein again.

FIG. 7A is a flowchart of still another embodiment of a full-screen display method according to this application.

In this embodiment, a display is a foldable screen, and the display does not perform split-screen display. In an expanded state, a complete screen is a graph whose aspect ratio is not in a preset interval; and in a folded state, a sub-screen is a graph whose aspect ratio is in the preset interval. For an example of the display, refer to FIG. 5B. Details are not described herein again.

The display does not perform split-screen display. Therefore, when a state of the display changes from a folded state to an expanded state, a screen displaying an application interface changes from a sub-screen to a complete screen; or when the state of the display changes from an expanded state to a folded state, the screen displaying the application interface changes from a complete screen to a sub-screen. The folded state herein may be an incompletely folded state or a fully folded state. In actual application, a specific sub-screen displaying the application interface is not limited in this application.

In this case, as shown in FIG. 7A, the method may include the following steps.

Step 701: When it is detected that an open-closed state of a display starts to change, determine a changing direction of the open-closed state of the display; and if the changing direction is from an expanded state to a folded state, perform step 702; or if the changing direction is from a folded state to an expanded state, perform step 703.

Step 702: Display an application interface in full screen in a window based on a current display direction of the application interface, to end this branch process.

Step 703: Display the application interface in full screen in the window based on a display direction specified by an application, to end this branch process.

In a possible implementation, if the display in this embodiment performs split-screen display, and the display performs split-screen display by using each sub-screen as a split screen, the application interface is displayed on a sub-screen, and the sub-screen is a graph whose aspect ratio is in the preset interval. In this case, before the step of determining the changing direction of the open-closed state of the display when it is detected that the open-closed state of the display starts to change, the method may further include: determining whether the display performs split-screen display; and if the display does not perform split-screen display, performing the step of determining the changing direction of the open-closed state of the display; or if the display performs split-screen display, performing step 702.

As shown in FIG. 7B, in an upper-left figure, a user is watching a video in full screen on a complete screen. According to the method shown in FIG. 7A, if the display is folded at this time, it is determined that the changing direction is from an expanded state to a folded state. Correspondingly, as shown in a lower-left diagram, the video is displayed in full screen on a sub-screen based on a current display direction of a video playing interface.

In an upper-right figure, the user is watching the video in full screen on a folded screen. Based on the method shown in FIG. 7A, if the display is expanded at this time, it is determined that the changing direction is from a folded state to an expanded state. Correspondingly, as shown in a lower-right diagram, the video is displayed in full screen on a complete screen after a direction of the video playing interface is rotated.

Figure 8A:
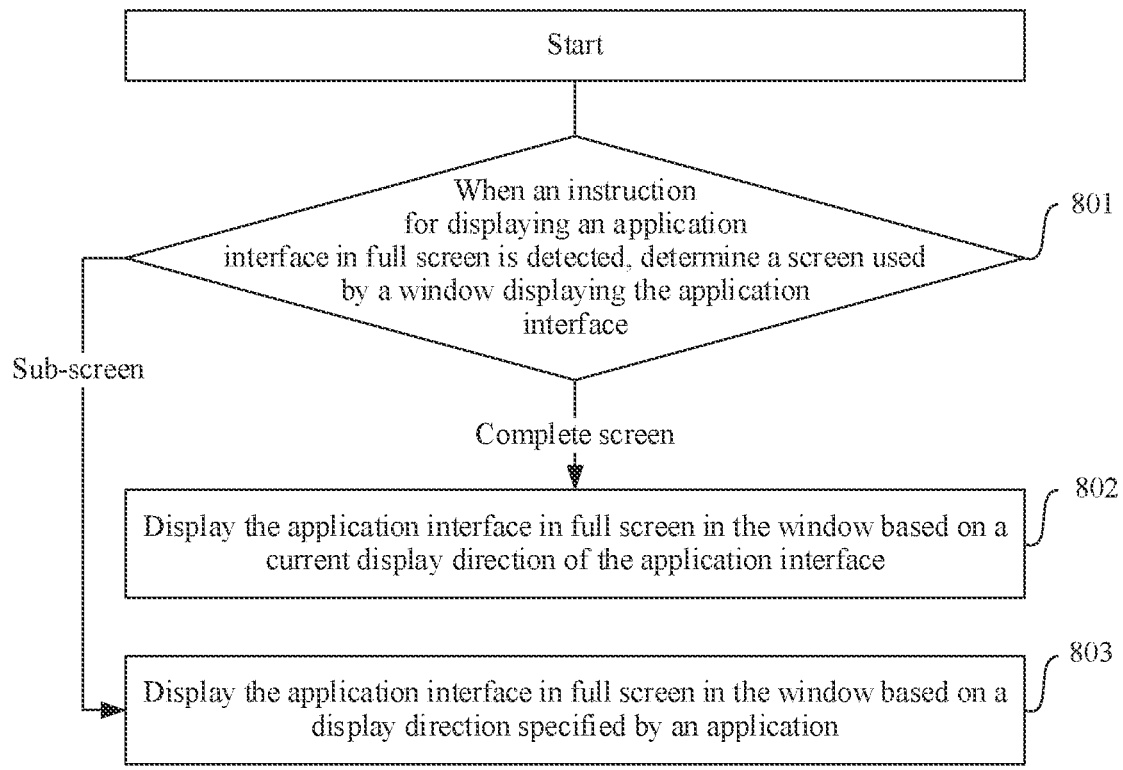
FIG. 8A is a flowchart of still another embodiment of a full-screen display method according to this application.

FIG. 8A is a flowchart of still another embodiment of a full-screen display method according to this application.

Figure 8B:
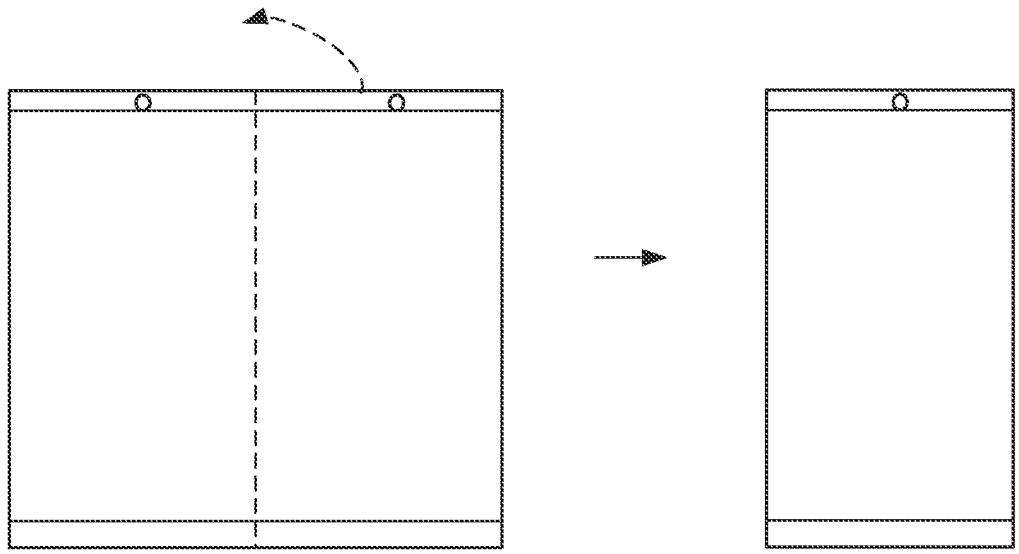
FIG. 8B is a schematic diagram of another structure and another shape of a display.

In this embodiment, a display is a foldable screen, and the display does not perform split-screen display. In an expanded state, a complete screen is a graph whose aspect ratio is in a preset interval; and in a folded state, a sub-screen is a graph whose aspect ratio is not in the preset interval. FIG. 8B is an example diagram of a folded state and an expanded state of the display when the display includes two sub-screens. The folded state herein may be an incompletely folded state or a fully folded state.

As shown in FIG. 8A, the method may include the following steps.

Step 801: When an instruction for displaying an application interface in full screen is detected, determine a screen used by a window displaying the application interface; and if the used screen is a complete screen, perform step 802; or if the used screen is a sub-screen, perform step 803.

Step 802: Display the application interface in full screen in the window based on a current display direction of the application interface, to end this branch process.

Step 803: Display the application interface in full screen in the window based on a display direction specified by an application, to end this branch process.

In a possible implementation, if the display in this embodiment performs split-screen display, and the display performs split-screen display by using each sub-screen as a split screen, the application interface is displayed on a sub-screen, and the sub-screen is a graph whose aspect ratio is not in the preset interval. In this case, before the step of determining, when the instruction for displaying the application interface in full screen is detected, the screen used by the window displaying the application interface, the method may further include: determining whether the display performs split-screen display; and if the display does not perform split-screen display, performing the step of determining the screen used by the window displaying the application interface: or if the display performs split-screen display, performing step 803.

Figure 8C:
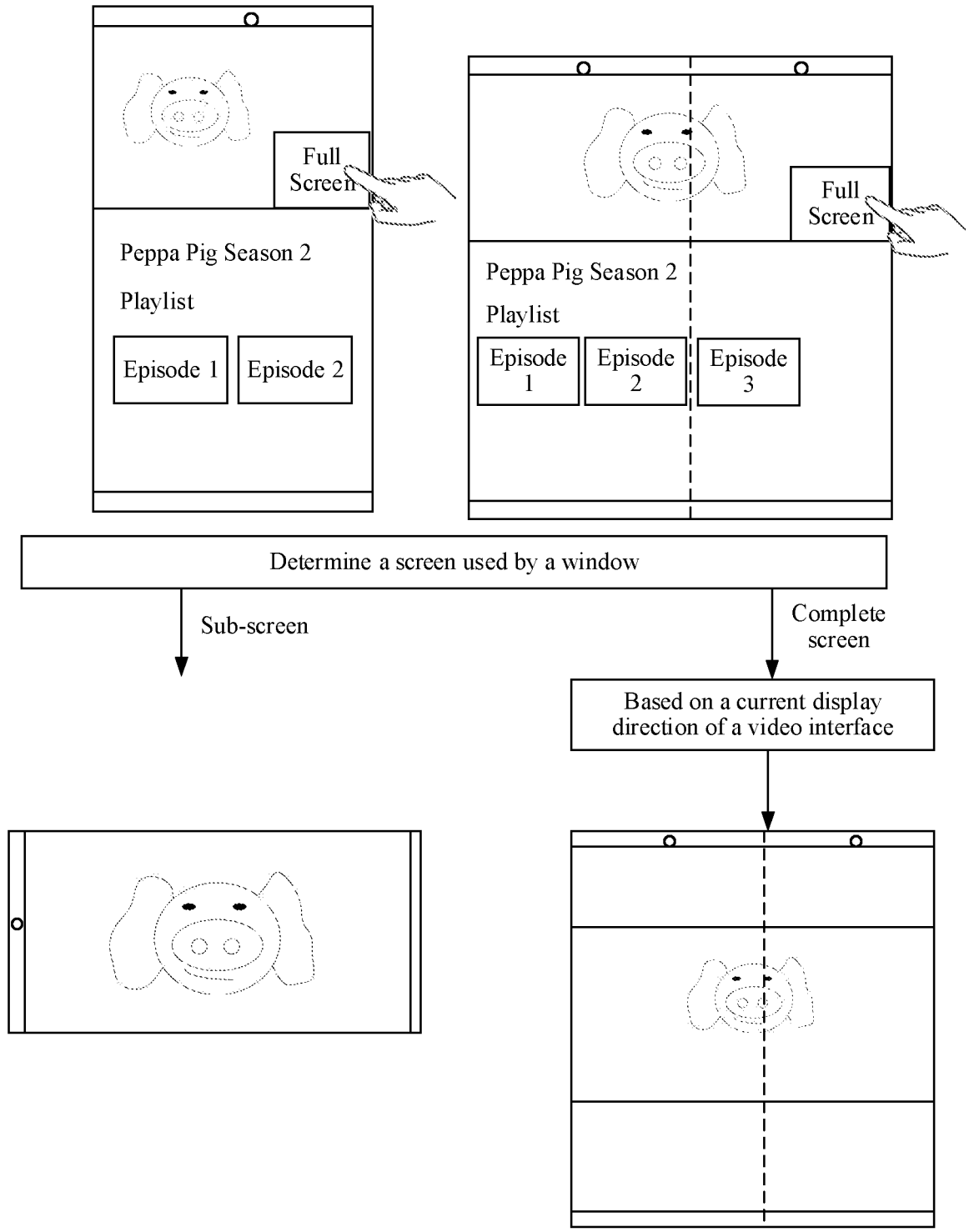
FIG. 8C is still another example diagram of a full-screen display method according to this application.

FIG. 8C is an example diagram of the embodiment shown in FIG. 8A. In an upper-left figure, a user taps a full-screen button when watching a video on a sub-screen. According to the method in FIG. 8A, it is determined that a used screen is a sub-screen. Correspondingly, as shown in a lower-left figure, the video is displayed in full screen on the sub-screen after a direction of a video playing interface is rotated.

In an upper-right figure, the user taps a full-screen button when watching the video on a complete screen. According to the method in FIG. 8A, it is determined that a used screen is a complete screen. Correspondingly, as shown in a lower-right figure, the video is displayed in full screen based on a current display direction of the video playing interface.

Figure 9:
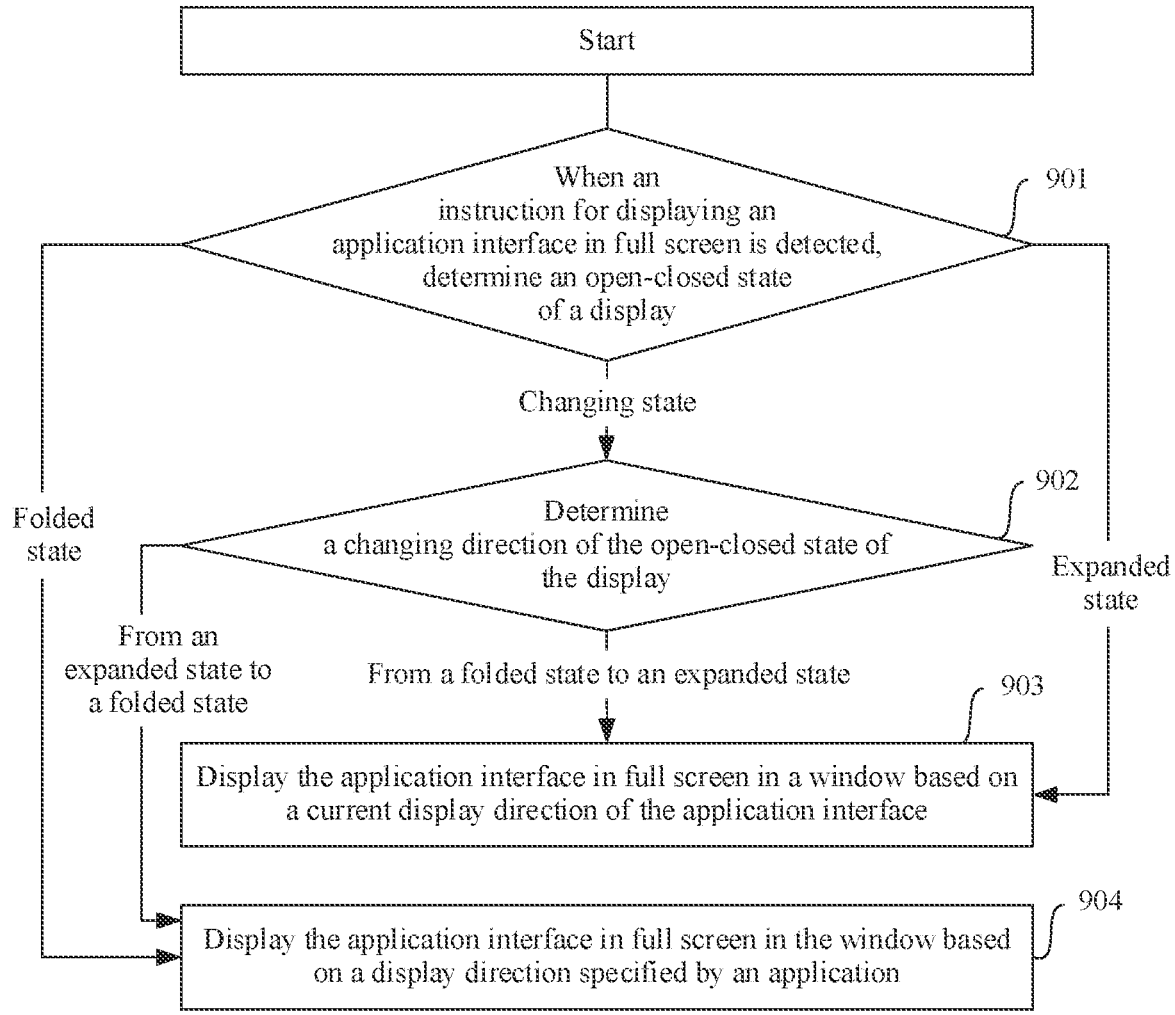
FIG. 9 is a flowchart of still another embodiment of a full-screen display method according to this application.

FIG. 9 is a flowchart of still another embodiment of a full-screen display method according to this application.

In this embodiment, a display is a foldable screen, and the display does not perform split-screen display. In a folded state, a sub-screen is a graph whose aspect ratio is not in a preset interval; and in an expanded state, a complete screen is a graph whose aspect ratio is in the preset interval. The folded state herein may be an incompletely folded state or a fully folded state. For an example of the display, refer to FIG. 8B. Details are not described herein again.

The display does not perform split-screen display. Therefore, when the display is in a folded state, one sub-screen in the display displays an application interface; when the display is in an expanded state, the complete screen displays the application interface; when a state of the display changes from a folded state to an expanded state, the complete screen displays the application interface; and when the state of the display changes from an expanded state to a folded state, one sub-screen displays the application interface. In actual application, a specific sub-screen displaying the application interface is not limited in this application.

In this case, as shown in FIG. 9, the method may include the following steps.

Step 901: When a full-screen instruction for an application interface is detected, determine an open-closed state of the display; and if the open-closed state of the display is an expanded state, perform step 903; or if the open-closed state of the display is a folded state, perform step 904; or if the open-closed state of the display is an open-closed changing state, perform step 902.

Step 902: Determine a changing direction of the open-closed state of the display; and if the changing direction is from a folded state to an expanded state, perform step 903; or if the changing direction is from an expanded state to a folded state, perform step 904.

Step 903: Display the application interface in full screen in the window based on a current display direction of the application interface, to end this branch process.

Step 904: Display the application interface in full screen in the window based on a display direction specified by an application, to end this branch process.

In a possible implementation, if the display in this embodiment performs split-screen display, and the display performs split-screen display by using each sub-screen as a split screen, the application interface is displayed on a sub-screen, and the sub-screen is a graph whose aspect ratio is not in the preset interval. In this case, before the step of determining the open-closed state of the display when the full-screen instruction for the application interface is detected, the method may further include: determining whether the display performs split-screen display; and if the display does not perform split-screen display, performing the step of determining the open-closed state of the display; or if the display performs split-screen display, performing step 904.

Figure 10A:
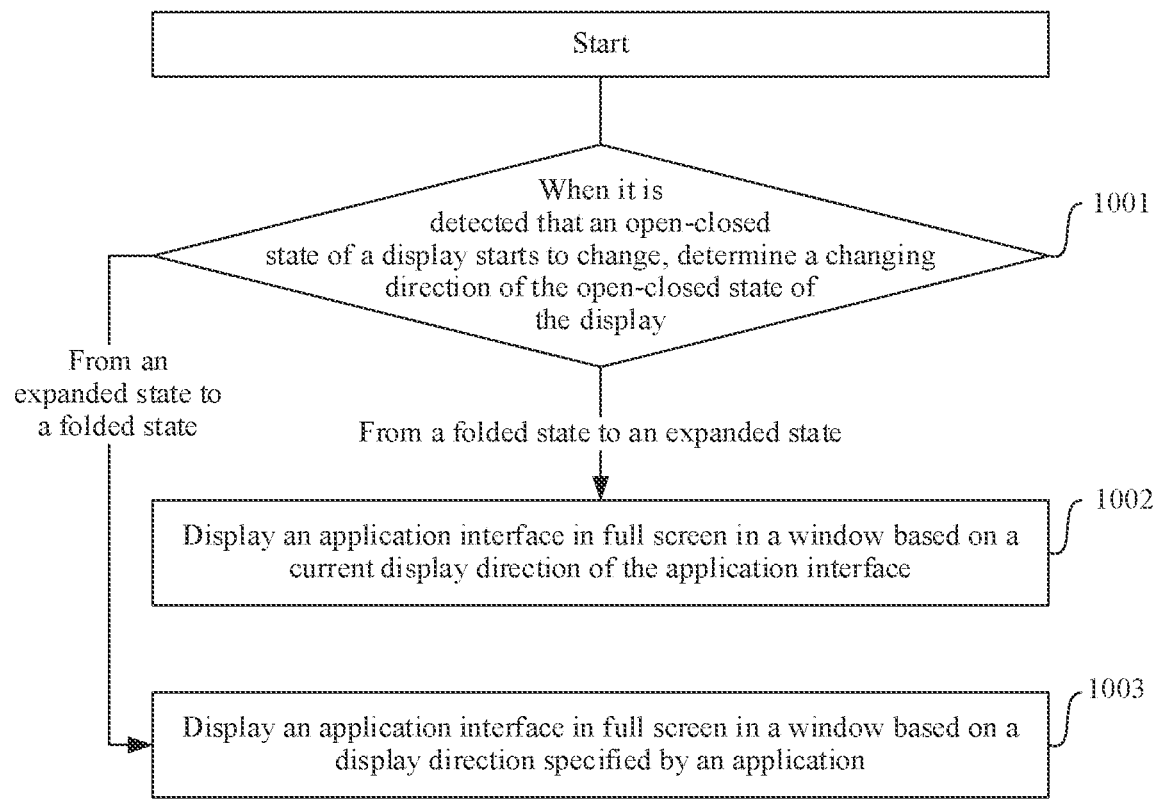
FIG. 10A is a flowchart of still another embodiment of a full-screen display method according to this application.
Figure 10B:
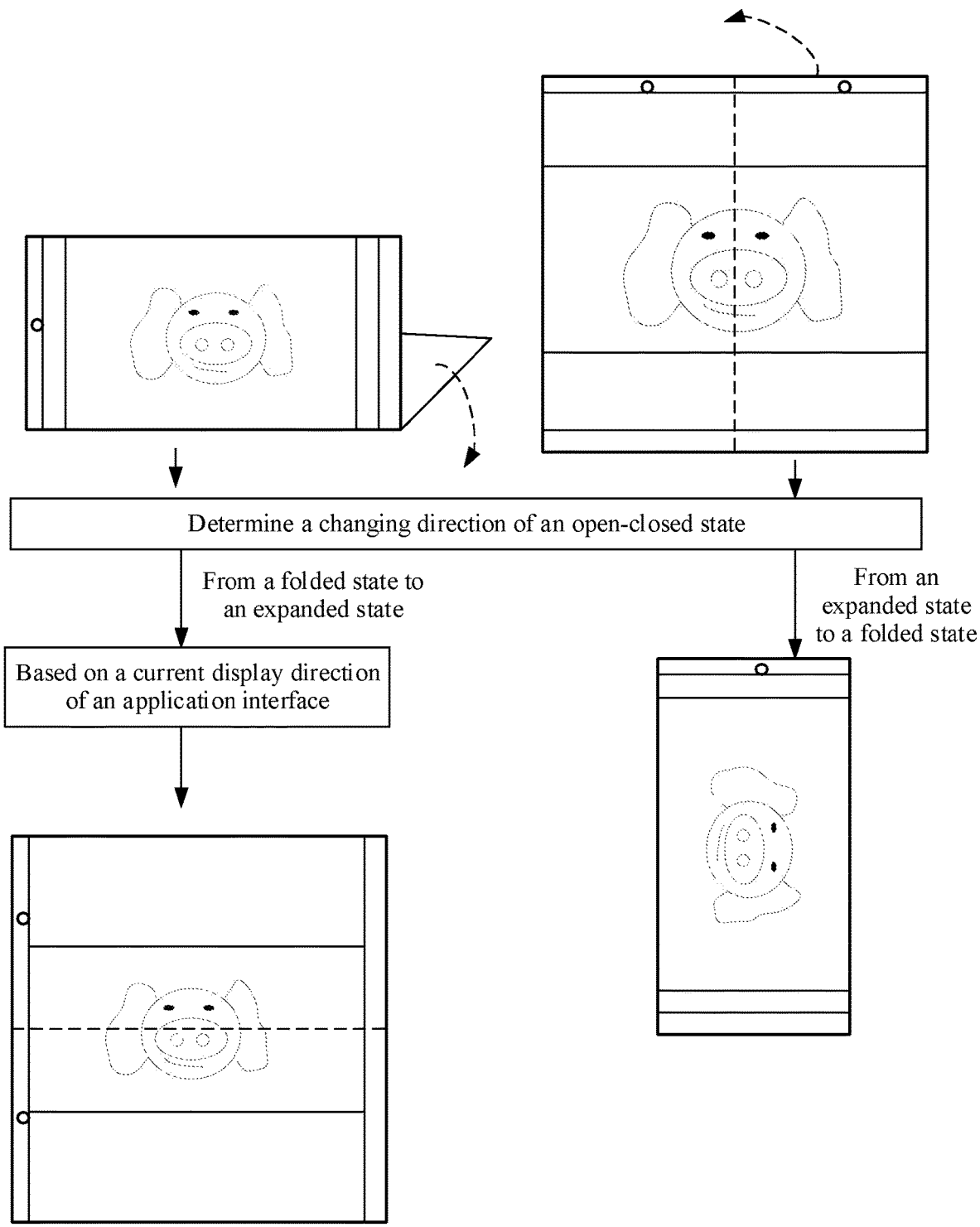
FIG. 10B is still another example diagram of a full-screen display method according to this application.

For an example in FIG. 9, refer to FIG. 8C and FIG. 10B. Details are not described herein again.

FIG. 10A is a flowchart of still another embodiment of a full-screen display method according to this application.

In this embodiment, a display is a foldable screen, and the display does not perform split-screen display. In a folded state, a sub-screen is a graph whose aspect ratio is not in a preset interval; and in an expanded state, a complete screen is a graph whose aspect ratio is in the preset interval. The folded state herein may be an incompletely folded state or a fully folded state. For an example of the display, refer to FIG. 8B. Details are not described herein again.

The display does not perform split-screen display. Therefore, when the state of the display changes from a folded state to an expanded state, a screen displaying an application interface changes from a sub-screen to a complete screen; or when the state of the display changes from an expanded state to a folded state, the screen displaying the application interface changes from a complete screen to a sub-screen. In actual application, a specific sub-screen displaying the application interface is not limited in this application.

In this case, as shown in FIG. 10A, the method may include the following steps.

Step 1001: When it is detected that an open-closed state of the display starts to change, determine a changing direction of the open-closed state of the display; and if the changing direction is from a folded state to an expanded state, perform step 1002; or if the changing direction is from an expanded state to a folded state, perform step 1003.

Step 1002: Display the application interface in full screen in a window based on a current display direction of the application interface, to end this branch process.

Step 1003: Display the application interface in full screen in the window based on a display direction specified by an application, to end this branch process.

In a possible implementation, if the application is a video player application, and a changing direction is from an expanded state to a folded state, full-screen displayed content of the application may change. For example, the displayed content returns from a full-screen window to a details page. This is not limited herein.

In a possible implementation, if the display in this embodiment performs split-screen display, and the display performs split-screen display by using each sub-screen as a split screen, the application interface is displayed on a sub-screen, and the sub-screen is a graph whose aspect ratio is not in the preset interval. In this case, before the step of determining the changing direction of the open-closed state of the display when it is detected that an open-closed state of a display starts to change, the method may further include: determining whether the display performs split-screen display; and if the display does not perform split-screen display, performing the step of determining the changing direction of the open-closed state of the display; or if the display performs split-screen display, performing step 1003.

As shown in FIG. 10B, in an upper-left figure, a user is watching a video in full screen on a sub-screen. According to the method shown in FIG. 10A, if the display is expanded at this time, it is determined that a changing direction is from a folded state to an expanded state. Correspondingly, as shown in a lower-left diagram, the video is displayed in full screen on a complete screen based on a current display direction of a video playing interface.

In an upper-right figure, the user is watching the video in full screen on a complete screen. According to the method shown in FIG. 10A, if the display is folded at this time, it is determined that a changing direction is from an expanded state to a folded state. Correspondingly, as shown in a lower-right diagram, the video is displayed in full screen on a sub-screen after a direction of the video playing interface is rotated.

In the foregoing embodiments in FIG. 5A to FIG. 10A, an example in which a foldable screen includes two sub-screens is used for description. Based on this, a person skilled in the art may extend embodiments of this application to a scenario in which a foldable screen includes more than two sub-screens. A principle is as follows. When a window displaying an application interface is a complete display area of a screen on which the window is located, a shape of the window may be determined based on a shape of the screen on which the window is located. Embodiments are not listed one by one herein.

In a possible implementation, a system of an electronic device, for example, an Android (Android) system, may determine whether a window is a graph whose aspect ratio is in a preset interval and perform full-screen display of an application interface. In this case, with reference to an implementation shown in FIG. 11A, the method may include the following steps.

Step 1101: When an application detects an instruction for displaying an application interface in full screen, the application sends a direction setting request to a system.

For a specific implementation in which the application detects the instruction for displaying the application interface in full screen, refer to the description in step 301. Details are not described herein again.

In a possible implementation, an example in which the system is an Android (Android) system is used. That the application sends a direction setting request to a system may include the following: The application sends setRequestedOrientation to the system.

Because a rectangular screen is used in a conventional technology, a direction setting request sent by an application in the conventional technology includes a display direction of an application interface, where the display direction is a landscape mode or a portrait mode. Specifically, if the application sends setRequestOrientation to the system, a parameter of the setRequestOrientation may be LANDSCAPE or PORTRAIT. For example, setRequestedOrientation(ActivityInfo.SCREEN_ORIENTATION_PORTRAIT) indicates the portrait mode, and setRequestedOrientation (ActivityInfo.SCREEN_ORIENTATION_LANDSCAPE) indicates the landscape mode. How the application determines the display direction in the direction setting request is not limited in this application.

Step 1102: The system receives the request, and determines whether a window displaying the application interface is a graph whose aspect ratio is in a preset interval; and if the window is a graph whose aspect ratio is in the preset interval, step 1103 is performed; or if the window is a graph whose aspect ratio is not in the preset interval, step 1104 is performed.

For how to determine whether the window is a graph whose aspect ratio is in the preset interval in this step, refer to various determining methods described in FIG. 4 to FIG. 10. Details are not described herein again.

Step 1103: The system displays the application interface in full screen in the window based on a current display direction of the application interface, to end this branch process.

In this step, the system may modify the parameter configuration of the setRequestedOrientation sent by the application to the system as: BEHIND, to indicate that the display direction of the application interface follows a current display direction of the application interface, and no rotation is needed to change the direction. For example, the parameter configuration is modified as setRequestedOrientation (ActivityInfo.SCREEN_ORIENTATION_BEHIND).

For example, for the following code, "landscape" or "portrait" may be replaced by "behind":

```
<activity
  android:configChanges=" . . . "
  android:name=".VideoPlayerActivity"
  android:screenOrientation="landscape"/>
or
<activity
  android:configChanges=" . . . "
  android:name=".VideoDetailActivity"
  android:screenOrientation="portrait"/>
```

For example, for the following code, "LANDSCAPE" or "PORTRAIT" may be replaced by "BEHIND":

```
Public void onClick(view v){
  RequestWindowFeature(Window.FEATURE_
     NO_TITLE);//Hide the title
  getWindow(            ).setFlags(WindowManager.
     LayoutParams.FLAG_FULLSCREEN,
  WindowManager.LayoutParams.
     FLAG_FULLSCREEN);//Set a full screen mode.
  setRequestedOrientation(ActivityInfo.SCREEN_ORI-
     ENTATION_LANDSCAPE);
}
or
Public void onClick(view v){
  setRequestedOrientation(ActivityInfo.SCREEN_ORI-
     ENTATION_PORTRAIT)
}
```

Step 1104: The system displays the application interface in full screen in the window based on the display direction requested in the direction setting request, to end this branch process.

In this step, with reference to the implementation in step 503, the system may not modify the parameter of setRequestedOrientation, to display the application interface in full screen in the window based on the parameter LANDSCAPE or PORTRAIT in setRequestedOrientation.

Figure 11A:
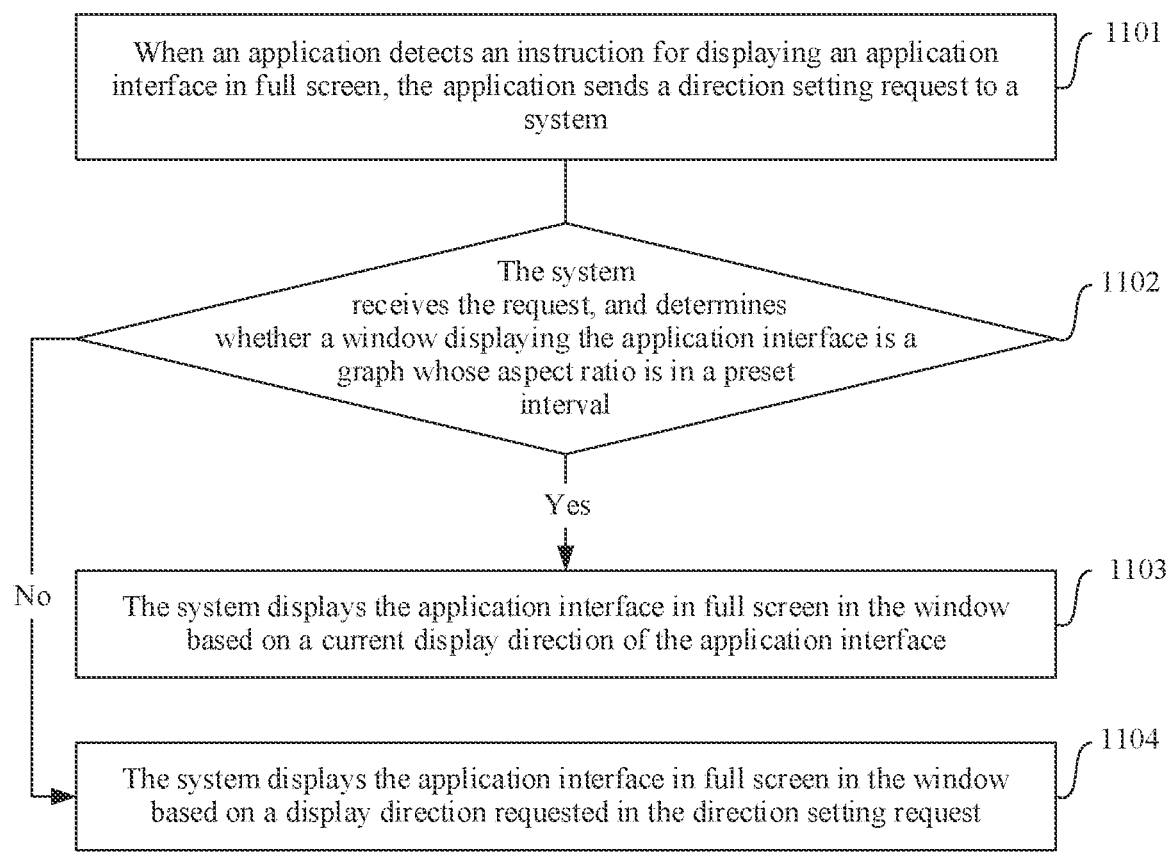
FIG. 11A is a flowchart of still another embodiment of a full-screen display method according to this application.
Figure 11B:
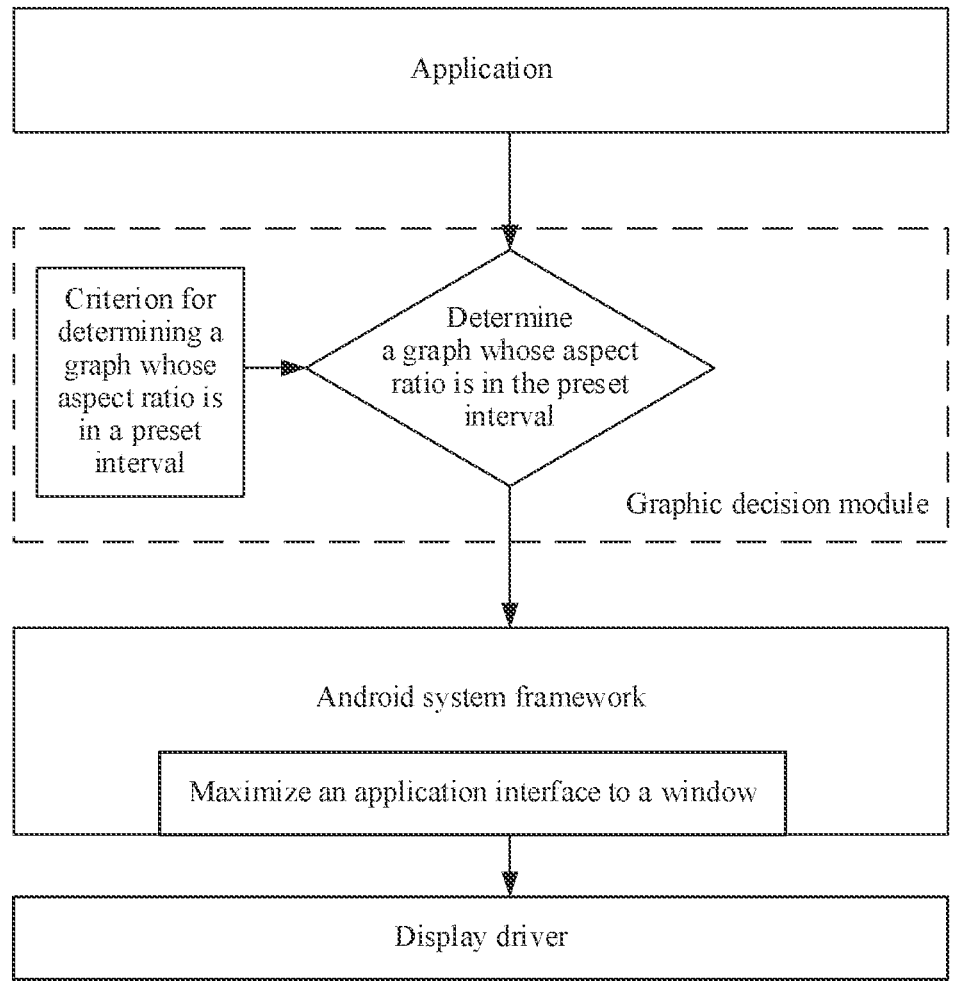
FIG. 11B is an example diagram of a possible implementation method of a full-screen display method in an Android system according to this application.

For example, as shown in FIG. 11B, a graphic decision module may be added on an Android system side. When receiving a direction setting request for a full-screen interface from an application, the graphic decision module determines, according to a preset determining criterion, whether a window displaying an application interface is a graphic whose aspect ratio is in a preset interval, and modifies a display direction in the direction setting request or maintains a display direction in the direction setting request based on a determining result. Then, an Android system architecture continues to perform subsequent full-screen display processing, and controls a display driver to display the application interface in full screen.

Based on the method shown in FIG. 3A, the method shown in FIG. 11A provides a method for determining, by a system, whether a window is a graph whose aspect ratio is in a preset interval. Improvement is made only on a system side, and no modification needs to be made on an application side.

It may be understood that some or all of the steps or operations in the foregoing embodiments are merely examples, and other operations or variations of various operations may be further performed in embodiments of this application. In addition, the steps may be performed in a sequence different from that presented in the foregoing embodiments, and not all operations in the foregoing embodiments may need to be performed.

Figure 12:
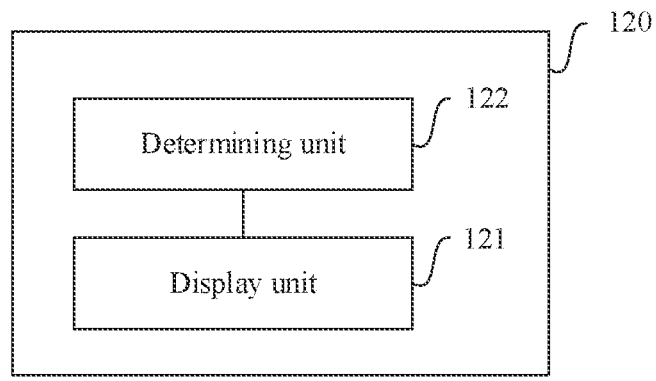
FIG. 12 is a schematic diagram of a structure of an embodiment of a full-screen display apparatus according to this application.

FIG. 12 is a schematic diagram of a structure of an embodiment of a full-screen display apparatus according to this application. As shown in FIG. 12, a full-screen display apparatus 120 may include:

a display unit 121, configured to display a multimedia file in non-full screen on an application interface; and a determining unit 122, configured to: detect an instruction for displaying the multimedia file in full screen, and determine whether a window displaying the application interface is a graph whose aspect ratio is in a preset interval, where the preset interval is an interval including 1.

The display unit 121 may be further configured to: if the window is a graph whose aspect ratio is in the preset interval, display the multimedia file in full screen in the window based on a current display direction of the application interface, where the current display direction of the application interface includes: a display direction of the application interface when the instruction for displaying the multimedia file in full screen is detected.

The determining unit 122 may be specifically configured to: obtain an aspect ratio of the window, and determine whether the aspect ratio is in the preset interval, where the preset interval is [0.75, 4/3].

A display of an electronic device that displays the application interface is a foldable screen, a complete screen in an expanded state is a graph whose aspect ratio is not in the preset interval, a sub-screen in a folded state is a graph whose aspect ratio is in the preset interval, and the display does not perform split-screen display. The determining unit 122 may be specifically configured to: determine a screen used by the window; and if the screen used by the window is a sub-screen, determine that the window is a graph whose aspect ratio is in the preset interval; or if the screen used by the window is a complete screen, determine that the window is a graph whose aspect ratio is not in the preset interval.

A display of an electronic device that displays the application interface is a foldable screen, a complete screen in an expanded state is a graph whose aspect ratio is in the preset interval, a sub-screen in a folded state is a graph whose aspect ratio is not in the preset interval, and the display does not perform split-screen display. The determining unit 122 may be specifically configured to: determine a screen used by the window; and if the screen used by the window is a complete screen, determine that the window is a graph whose aspect ratio is in the preset interval; or if the screen used by the window is a sub-screen, determine that the window is a graph whose aspect ratio is not in the preset interval.

A display of an electronic device that displays the application interface is a foldable screen, a complete screen in an expanded state is a graph whose aspect ratio is not in the preset interval, a sub-screen in a folded state is a graph whose aspect ratio is in the preset interval, and the display does not perform split-screen display. The determining unit 122 may be specifically configured to: determine an open-closed state of the display; and if the open-closed state of the display is a folded state, determine that the window is a graph whose aspect ratio is in the preset interval; or if the open-closed state of the display is an expanded state, determine that the window is a graph whose aspect ratio is not in the preset interval; or if the open-closed state of the display is an open-closed changing state, determine a changing direction of the open-closed changing state of the display; and if the changing direction is from an expanded state to a folded state, determine that the window is a graph whose aspect ratio is in the preset interval; or if the changing direction is from a folded state to an expanded state, determine that the window is a graph whose aspect ratio is not in the preset interval.

A display of an electronic device that displays the application interface is a foldable screen, a complete screen in an expanded state is a graph whose aspect ratio is in the preset interval, a sub-screen in a folded state is a graph whose aspect ratio is not in the preset interval, and the display does not perform split-screen display. The determining unit 122 may be specifically configured to: determine an open-closed state of the display; and if the open-closed state of the display is an expanded state, determine that the window is a graph whose aspect ratio is in the preset interval; or if the open-closed state of the display is a folded state, determine that the window is a graph whose aspect ratio is not in the preset interval; or if the open-closed state of the display is an open-closed changing state, determine a changing direction of the open-closed changing state of the display; and if the changing direction is from a folded state to an expanded state, determine that the window is a graph whose aspect ratio is in the preset interval; or if the changing direction is from an expanded state to a folded state, determine that the window is a graph whose aspect ratio is not in the preset interval.

The determining unit 122 may be further configured to: detect that the open-closed state of the display changes, and determine, based on the changing direction of the open-closed state, whether a window displaying the multimedia file after the open-closed state changes is a graph whose aspect ratio is in the preset interval; and if the window displaying the multimedia file is a graph whose aspect ratio is in the preset interval, display, based on a current display direction of the multimedia file, the multimedia file in full screen in the window displaying the multimedia file, where the current display direction of the multimedia file includes: a display direction of the multimedia file obtained when it is detected that the open-closed state of the display changes.

A complete screen of the display in an expanded state is a graph whose aspect ratio is not in the preset interval, a sub-screen in a folded state is a graph whose aspect ratio is in the preset interval, and the display does not perform split-screen display. The determining unit 122 may be specifically configured to: determine a changing direction of the open-closed changing state of the display; and if the changing direction is from an expanded state to a folded state, determine that the window displaying the multimedia file is a graph whose aspect ratio is in the preset interval; or if the changing direction is from a folded state to an expanded state, determine that the window displaying the multimedia file is a graph whose aspect ratio is not in the preset interval.

A complete screen of the display in an expanded state is a graph whose aspect ratio is in the preset interval, a sub-screen in a folded state is a graph whose aspect ratio is not in the preset interval, and the display does not perform split-screen display. The determining unit 122 may be specifically configured to: determine a changing direction of the open-closed changing state of the display; and if the changing direction is from a folded state to an expanded state, determine that the window displaying the multimedia file is a graph whose aspect ratio is in the preset interval; or if the changing direction is from an expanded state to a folded state, determine that the window displaying the multimedia file is a graph whose aspect ratio is not in the preset interval.

The determining unit 122 may be specifically configured to receive a direction setting request sent by an application to which the application interface belongs, where the direction setting request is sent by the application when the application detects the instruction for displaying the multimedia file in full screen, and the direction setting request carries a display direction specified by the application for the application interface.

The display unit 121 may be specifically configured to: modify the display direction specified by the application in the direction setting request to the current display direction of the application interface; and display the multimedia file in full screen in the window based on a modified direction setting request.

The full-screen display apparatus provided in the embodiment shown in FIG. 12 may be configured to execute the technical solutions in the method embodiments shown in FIG. 3A to FIG. 11A of this application. For an implementation principle and a technical effect of the full-screen display apparatus, further refer to the related descriptions in the method embodiments.

It should be understood that division of the units of the full-screen display apparatus shown in FIG. 12 is merely logical function division. In an actual implementation, all or some of the units may be integrated into one physical entity, or may be physically separated. All the units may be implemented in a form of software invoked by a processing element, or may be implemented in a form of hardware; or some units may be implemented in a form of software invoked by a processing element, and some units may be implemented in a form of hardware. For example, the display unit may be an independently disposed processing element, or may be integrated into a chip of an electronic device for implementation. Implementation of another unit is similar thereto. In addition, all or some of the units may be integrated together, or may be implemented independently. In an implementation process, steps in the foregoing methods or the foregoing units may be implemented by using a hardware integrated logic circuit in the processing element, or by using instructions in a form of software.

For example, the foregoing units may be one or more integrated circuits configured to implement the foregoing method, for example, one or more application-specific integrated circuits (Application Specific Integrated Circuit, ASIC for short below), one or more digital signal processors (Digital Signal Processor, DSP for short below), or one or more field programmable gate arrays (Field Programmable Gate Array, FPGA for short below). For another example, the units may be integrated together and implemented in a form of a system-on-a-chip (System-On-a-Chip, SOC for short below).

Figure 13:
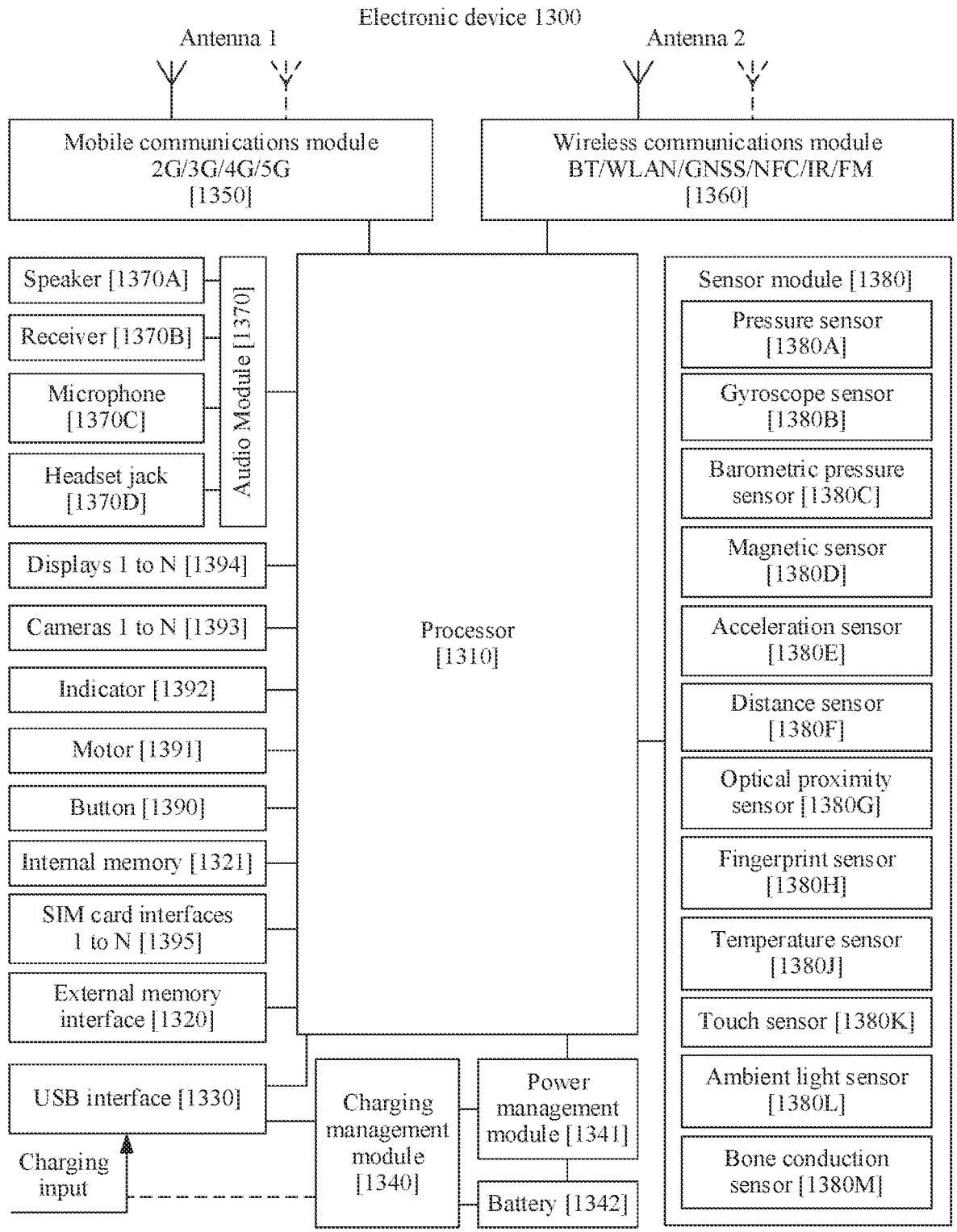
FIG. 13 is a schematic diagram of a structure of an embodiment of an electronic device according to an embodiment of this application.

FIG. 13 is a schematic diagram of a structure of an embodiment of an electronic device according to this application. As shown in FIG. 13, the electronic device may include: a display, one or more processors, a memory, and one or more computer programs.

The display may include a display of a vehicle-mounted computer (mobile data center). The electronic device may be a device such as a mobile terminal (a mobile phone), a smart screen, an unmanned aerial vehicle, an intelligent connected vehicle (Intelligent Connected Vehicle, ICV for short below), a smart/intelligent car (smart/intelligent car), or a vehicle-mounted device.

The one or more computer programs are stored in the memory, the one or more computer programs include instructions, and when the instructions are executed by the device, the device is enabled to perform the methods shown in FIG. 3A to FIG. 11A

The electronic device shown in FIG. 13 may be a terminal device, or may be a circuit device built in the terminal device. The device may be configured to perform functions/ steps in the methods provided in the embodiments shown in FIG. 3A to FIG. 11A of this application.

An electronic device 1300 may include a processor 1310, an external memory interface 1320, an internal memory 1321, a universal serial bus (universal serial bus, USB) interface 1330, a charging management module 1340, a power management module 1341, a battery 1342, an antenna 1, an antenna 2, a mobile communication module 1350, a wireless communication module 1360, an audio module 1370, a speaker 1370A, a receiver 1370B, a microphone 1370C, a headset jack 1370D, a sensor module 1380, a button 1390, a motor 1391, an indicator 1392, a camera 1393, a display 1394, a subscriber identification module (subscriber identification module, SIM) card interface 1395, and the like. The sensor module 1380 may include a pressure sensor 1380A, a gyroscope sensor 1380B, a barometric pressure sensor 1380C, a magnetic sensor 1380D, an acceleration sensor 1380E, a distance sensor 1380F, an optical proximity sensor 1380G, a fingerprint sensor 1380H, a temperature sensor 1380J, a touch sensor 1380K, an ambient light sensor 1380L, a bone conduction sensor 1380M, and the like.

It may be understood that the structure illustrated in this embodiment of the present invention does not constitute a specific limitation on the electronic device 1300. In other embodiments of this application, the electronic device 1300 may include more or fewer components than those shown in the figure, or combine some components, or split some components, or have a different component arrangement. The components shown in the figure may be implemented by hardware, software, or a combination of software and hardware.

The processor 1310 may include one or more processing units. For example, the processor 1310 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, and/or a neural-network processing unit (neural-network processing unit, NPU). Different processing units may be independent components, or may be integrated into one or more processors.

The controller may generate an operation control signal based on an instruction operation code and a time sequence signal, to control instruction fetching and instruction execution.

A memory may be further disposed in the processor 1310, and is configured to store instructions and data. In some embodiments, the memory in the processor 1310 is a cache. The memory may store instructions or data just used or cyclically used by the processor 1310. If the processor 1310 needs to use the instructions or the data again, the processor 1310 may directly invoke the instructions or the data from the memory. In this way, repeated access is avoided, waiting time of the processor 1310 is reduced, and system efficiency is improved.

In some embodiments, the processor 1310 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). In some embodiments, the processor 1310 may include a plurality of groups of I2C buses. The processor 1310 may be separately coupled to the touch sensor 1380K, a charger, a flash, the camera 1393, and the like by using different I2C bus interfaces. For example, the processor 1310 may be coupled to the touch sensor 1380K by using an I2C interface, so that the processor 1310 communicates with the touch sensor 1380K by using the I2C bus interface, to implement a touch function of the electronic device 1300.

The I2S interface may be used for audio communication. In some embodiments, the processor 1310 may include a plurality of groups of I2S buses. The processor 1310 may be coupled to the audio module 1370 through the I2S bus, to implement communication between the processor 1310 and the audio module 1370. In some embodiments, the audio module 1370 may transmit an audio signal to the wireless communication module 1360 through the I2S interface, to implement a function of answering a call through a Bluetooth headset.

The PCM interface may also be used for audio communication, to sample, quantize, and encode an analog signal. In some embodiments, the audio module 1370 may be coupled to the wireless communication module 1360 through a PCM bus interface. In some embodiments, the audio module 1370 may alternatively transmit an audio signal to the wireless communication module 1360 through the PCM interface, to implement a function of answering a call through a Bluetooth headset. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication. In some embodiments, the UART interface is usually configured to connect the processor 1310 to the wireless communication module 1360. For example, the processor 1310 communicates with a Bluetooth module in the wireless communication module 1360 through the UART interface, to implement a Bluetooth function. In some embodiments, the audio module 1370 may transmit an audio signal to the wireless communication module 1360 through the UART interface, to implement a function of playing music through a Bluetooth headset.

The MIPI interface may be configured to connect the processor 1310 to a peripheral component such as the display 1394 or the camera 1393. The MIPI interface includes a camera serial interface (camera serial interface, CSI), a display serial interface (display serial interface, DSI), and the like. In some embodiments, the processor 1310 communicates with the camera 1393 through the CSI interface, to implement a photographing function of the electronic device 1300. The processor 1310 communicates with the display 1394 through the DSI interface, to implement a display function of the electronic device 1300.

The GPIO interface may be configured by using software. The GPIO interface may be configured as a control signal or a data signal. In some embodiments, the GPIO interface may be configured to connect the processor 1310 to the camera 1393, the display 1394, the wireless communication module 1360, the audio module 1370, the sensor module 1380, or the like. The GPIO interface may be further configured as an I2C interface, an I2S interface, a UART interface, an MIPI interface, or the like.

The USB interface 1330 is an interface that conforms to a USB standard specification, and may be specifically a Mini USB interface, a Micro USB interface, a USB Type-C interface, or the like. The USB interface 1330 may be configured to connect to a charger to charge the electronic device 1300, or may be configured to transmit data between the electronic device 1300 and a peripheral device, or may be configured to connect to a headset, to play audio through the headset. The interface may further be configured to connect to another electronic device such as an AR device.

It may be understood that an interface connection relationship between modules illustrated in this embodiment of the present invention is merely an example for description, and does not constitute a limitation on a structure of the electronic device 1300. In some other embodiments of this application, the electronic device 1300 may alternatively use an interface connection manner different from that in the foregoing embodiment, or a combination of a plurality of interface connection manners.

The charging management module 1340 is configured to receive a charging input from a charger. The charger may be a wireless charger or a wired charger. In some wired charging embodiments, the charging management module 1340 may receive a charging input from a wired charger through the USB interface 1330. In some wireless charging embodiments, the charging management module 1340 may receive a wireless charging input through a wireless charging coil of the electronic device 1300. When charging the battery 1342, the charging management module 1340 may further supply power to the electronic device by using the power management module 1341.

The power management module 1341 is configured to connect to the battery 1342, the charging management module 1340, and the processor 1310. The power management module 1341 receives an input from the battery 1342 and/or the charging management module 1340, and supplies power to the processor 1310, the internal memory 1321, the display 1394, the camera 1393, the wireless communication module 1360, and the like. The power management module 1341 may be further configured to monitor parameters such as a battery capacity, a battery cycle count, and a battery health status (electric leakage or impedance). In some other embodiments, the power management module 1341 may alternatively be disposed in the processor 1310. In some other embodiments, the power management module 1341 and the charging management module 1340 may alternatively be disposed in a same component.

A wireless communication function of the electronic device 1300 may be implemented by using the antenna 1, the antenna 2, the mobile communication module 1350, the wireless communication module 1360, the modem processor, the baseband processor, and the like.

The antenna 1 and the antenna 2 are configured to transmit and receive electromagnetic wave signals. Each antenna in the electronic device 1300 may be configured to cover one or more communication frequency bands. Different antennas may be multiplexed to improve antenna utilization. For example, the antenna 1 may be multiplexed as a diversity antenna in a wireless local area network. In some other embodiments, an antenna may be used in combination with a tuning switch.

The mobile communication module 1350 may provide a solution that includes wireless communication such as 2G/3G/4G/5G and that is applied to the electronic device 1300. The mobile communication module 1350 may include at least one filter, a switch, a power amplifier, a low noise amplifier (low noise amplifier. LNA), and the like. The mobile communication module 1350 may receive an electromagnetic wave by using the antenna 1, perform processing such as filtering and amplification on the received electromagnetic wave, and transmit a processed electromagnetic wave to the modem processor for demodulation. The mobile communication module 1350 may further amplify a signal modulated by the modem processor, and convert the signal into an electromagnetic wave for radiation by using the antenna 1. In some embodiments, at least some functional modules of the mobile communication module 1350 may be disposed in the processor 1310. In some embodiments, at least some functional modules of the mobile communication module 1350 and at least some modules of the processor 1310 may be disposed in a same component.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Then, the demodulator transfers the low-frequency baseband signal obtained through demodulation to the baseband processor for processing. After being processed by the baseband processor, the low-frequency baseband signal is transmitted to the application processor. The application processor outputs a sound signal through an audio device (not limited to the speaker 1370A, the receiver 1370B, or the like), or displays an image or a video by using the display 1394. In some embodiments, the modem processor may be an independent component. In some other embodiments, the modem processor may be independent of the processor 1310, and is disposed in a same component as the mobile communication module 1350 or another functional module.

The wireless communication module 1360 may provide a wireless communication solution that is applied to the electronic device 1300 and that includes a wireless local area network (wireless local area networks, WLAN) (for example, a wireless fidelity (wireless fidelity. Wi-Fi) network), Bluetooth (bluetooth, BT), a global navigation satellite system (global navigation satellite system, GNSS), frequency modulation (frequency modulation, FM), a near field communication (near field communication. NFC) technology, an infrared (infrared, IR) technology, or the like. The wireless communication module 1360 may be one or more components integrating at least one communication processing module. The wireless communication module 1360 receives an electromagnetic wave through the antenna 2, performs frequency modulation and filtering processing on the electromagnetic wave signal, and sends a processed signal to the processor 1310. The wireless communication module 1360 may further receive a to-be-sent signal from the processor 1310, perform frequency modulation and amplification on the signal, and convert the signal into an electromagnetic wave for radiation through the antenna 2.

In some embodiments, in the electronic device 1300, the antenna 1 and the mobile communication module 1350 are coupled, and the antenna 2 and the wireless communication module 1360 are coupled, so that the electronic device 1300 can communicate with a network and another device by using a wireless communication technology. The wireless communication technology may include a global system for mobile communication (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC. FM, an IR technology, and/or the like. The GNSS may include a global positioning system (global positioning system, GPS), a global navigation satellite system (global navigation satellite system. GLO-NASS), a BeiDou navigation satellite system (beidou navigation satellite system, BDS), a quasi-zenith satellite system (quasi-zenith satellite system. QZSS), and/or a satellite based augmentation system (satellite based augmentation systems, SBAS).

The electronic device 1300 implements a display function by using the GPU, the display 1394, the application processor, and the like. The GPU is a microprocessor for image processing, and is connected to the display 1394 and the application processor. The GPU is configured to: perform mathematical and geometric calculation, and render an image. The processor 1310 may include one or more GPUs that execute program instructions to generate or change display information.

The display 1394 is configured to display an image, a video, and the like. The display 1394 includes a display panel. The display panel may use a liquid crystal display (liquid crystal display, LCD), an organic light-emitting diode (organic light-emitting diode. OLED), an active-matrix organic light emitting diode (active-matrix organic light emitting diode, AMOLED), a flexible light-emitting diode (flex light-emitting diode, FLED), a mini LED, a micro LED, a micro OLED, a quantum dot light emitting diode (quantum dot light emitting diodes, QLED), or the like. In some embodiments, the electronic device 1300 may include one or N displays 1394, where N is a positive integer greater than 1.

The electronic device 1300 may implement a photographing function by using the ISP, the camera 1393, the video codec, the GPU, the display 1394, the application processor, and the like.

The ISP is configured to process data fed back by the camera 1393. For example, during photographing, a shutter is pressed, and a light ray is transmitted to a photosensitive element of a camera through a lens. An optical signal is converted into an electrical signal. The photosensitive element of the camera transmits the electrical signal to the ISP for processing, and converts the electrical signal into a visible image. The ISP may further perform algorithm optimization on noise, brightness, and complexion that are of the image. The ISP may further optimize parameters such as exposure and color temperature that are of a photographing scenario. In some embodiments, the ISP may be disposed in the camera 1393.

The camera 1393 is configured to capture a static image or a video. An optical image of an object is generated by using the lens, and is projected onto the photosensitive element. The photosensitive element may be a charge coupled device (charge coupled device, CCD) or a complementary metal-oxide-semiconductor (complementary metal-oxide-semiconductor, CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format, for example, an RGB format or a YUV format. In some embodiments, the electronic device 1300 may include one or N cameras 1393, where N is a positive integer greater than 1.

The digital signal processor is configured to process a digital signal, and may process another digital signal in addition to a digital image signal. For example, when the electronic device 1300 selects a frequency, the digital signal processor is configured to perform Fourier transform on frequency energy, and the like.

The video codec is configured to compress or decompress a digital video. The electronic device 1300 may support one or more video codecs. Therefore, the electronic device 1300 may play or record videos in a plurality of coding formats, for example, moving picture experts group (moving picture experts group, MPEG) 1, MPEG 2, MPEG 3, and MPEG 4.

The NPU is a neural-network (neural-network, NN) computing processor. The NPU quickly processes input information with reference to a structure of a biological neural network, for example, a transfer mode between human brain neurons, and may further continuously perform self-learning. Applications such as intelligent cognition of the electronic device 1300, such as image recognition, facial recognition, speech recognition, and text understanding, may be implemented by using the NPU.

The external memory interface 1320 may be configured to connect to an external storage card, for example, a micro SD card, to extend a storage capability of the electronic device 1300. The external storage card communicates with the processor 1310 through the external memory interface 1320, to implement a data storage function. For example, files such as music and a video are stored in the external storage card.

The internal memory 1321 may be configured to store computer executable program code, where the executable program code includes instructions. The internal memory 1321 may include a program storage area and a data storage area. The program storage area may store an operating system, an application required by at least one function (for example, a sound playing function or an image playing function), and the like. The data storage area may store data (for example, audio data, and a phone book) created during a process of using the electronic device 1300, and the like. In addition, the internal memory 1321 may include a high-speed random access memory, or may include a nonvolatile memory, such as at least one magnetic disk storage device, a flash memory, or a universal flash storage (universal flash storage, UFS). The processor 1310 executes various functional applications of the electronic device 1300 and data processing by running the instructions stored in the internal memory 1321 and/or instructions stored in the memory that is disposed in the processor.

The electronic device 1300 may implement audio functions by using the audio module 1370, the speaker 1370A, the receiver 1370B, the microphone 1370C, the headset jack 1370D, the application processor, and the like. For example, a music playback function and a recording function are implemented.

The audio module 1370 is configured to convert digital audio information into an analog audio signal output, and is also configured to convert an analog audio input into a digital audio signal. The audio module 1370 may be further configured to: encode and decode an audio signal. In some embodiments, the audio module 1370 may be disposed in the processor 1310, or some function modules of the audio module 1370 are disposed in the processor 1310.

The speaker 1370A, also referred to as a "loudspeaker", is configured to convert an audio electrical signal into a sound signal. The electronic device 1300 may listen to music or answer a hands-free call by using the speaker 1370A.

The receiver 1370B, also referred to as an "earpiece", is configured to convert an audio electrical signal into a sound signal. When a call is answered or voice information is listened to by using the electronic device 1300, the receiver 1370B may be put close to a human ear to listen to a voice.

The microphone 1370C, also referred to as a "mike" or a "microphone", is configured to convert a sound signal into an electrical signal. When making a call or sending voice information, a user may place the mouth of the user near the microphone 1370C to make a sound, to input a sound signal to the microphone 1370C. At least one microphone 1370C may be disposed in the electronic device 1300. In some other embodiments, two microphones 1370C may be disposed in the electronic device 1300, to collect a sound signal and further implement a noise reduction function. In some other embodiments, three, four, or more microphones 1370C may alternatively be disposed in the electronic device 1300, to collect a sound signal, implement noise reduction, and identify a sound source, to implement a directional recording function, and the like.

The headset jack 1370D is configured to connect to a wired headset. The headset jack 1370D may be a USB interface 1330, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 1380A is configured to sense a pressure signal, and may convert the pressure signal into an electrical signal. In some embodiments, the pressure sensor 1380A may be disposed on the display 1394. There are many types of pressure sensors 1380A, such as a resistive pressure sensor, an inductive pressure sensor, and a capacitive pressure sensor. The capacitive pressure sensor may include at least two parallel plates that are made of conductive materials. When a force is applied to the pressure sensor 1380A, capacitance between electrodes changes. The electronic device 1300 determines pressure intensity based on a capacitance change. When a touch operation is performed on the display 1394, the electronic device 1300 detects intensity of the touch operation by using the pressure sensor 1380A. The electronic device 1300 may also calculate a touch position based on a detection signal of the pressure sensor 1380A. In some embodiments, touch operations that are performed at a same touch position but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on the SMS message application icon, an instruction for creating an SMS message is executed.

The gyroscope sensor 1380B may be configured to determine a motion posture of the electronic device 1300. In some embodiments, an angular velocity of the electronic device 100 around three axes (namely, axes x, y, and z) may be determined by using the gyroscope sensor 1380B. The gyroscope sensor 1380B may be configured to implement image stabilization during photographing. For example, when the shutter is pressed, the gyroscope sensor 1380B detects an angle at which the electronic device 1300 jitters, calculates, based on the angle, a distance for which a lens module needs to compensate, and allows the lens to cancel the jitter of the electronic device 1300 through reverse motion, to implement image stabilization. The gyroscope sensor 1380B may be further used in navigation and a motion sensing game scenario.

The barometric pressure sensor 1380C is configured to measure barometric pressure. In some embodiments, the electronic device 1300 calculates an altitude by using a barometric pressure value measured by the barometric pressure sensor 1380C, to assist in positioning and navigation.

The magnetic sensor 1380D includes a Hall sensor. The electronic device 1300 may detect opening and closing of a flip leather case by using the magnetic sensor 1380D. In some embodiments, when the electronic device 1300 is a flip phone, the electronic device 1300 may detect opening and closing of a flip cover based on the magnetic sensor 1380D. Further, a feature such as automatic unlocking of the flip cover are set based on a detected opening or closing state of the leather case or a detected opening or closing state of the flip cover.

The acceleration sensor 1380E may detect magnitudes of accelerations in various directions (generally on three axes) of the electronic device 1300. When the electronic device 1300 is stationary, a magnitude and a direction of gravity may be detected. The electronic device 1300 may be further configured to identify a posture of the electronic device, and is used in screen switching between a landscape mode and a portrait mode, a pedometer, or another application.

The distance sensor 1380F is configured to measure a distance. The electronic device 1300 may measure a distance in an infrared manner or a laser manner. In some embodiments, in a photographing scenario, the electronic device 1300 may measure a distance by using the distance sensor 1380F, to implement quick focusing.

The optical proximity sensor 1380G may include a light-emitting diode (LED) and an optical detector, for example, a photodiode. The light-emitting diode may be an infrared light-emitting diode. The electronic device 1300 emits infrared light by using the light-emitting diode. The electronic device 1300 detects infrared reflected light from a nearby object by using the photodiode. When sufficient reflected light is detected, the electronic device 1300 may determine that there is an object near the electronic device 1300. When insufficient reflected light is detected, the electronic device 1300 may determine that there is no object near the electronic device 1300. The electronic device 1300 may detect, by using the optical proximity sensor 1380G, that a user holds the electronic device 1300 close to an ear to make a call, to automatically turn off a screen for power saving. The proximity sensor 1380G can also be used in a leather case mode or a pocket mode to automatically unlock or lock the screen.

The ambient light sensor 1380L is configured to sense ambient light brightness. The electronic device 1300 may adaptively adjust brightness of the display 1394 based on sensed ambient light brightness. The ambient optical sensor 1380L may also be configured to automatically adjust white balance during photographing. The ambient optical sensor 1380L may further cooperate with the optical proximity sensor 1380G to detect whether the electronic device 1300 is in a pocket, to prevent an accidental touch.

The fingerprint sensor 1380H is configured to collect a fingerprint. The electronic device 1300 may use a feature of the collected fingerprint to implement fingerprint-based unlocking, application lock access, fingerprint-based photographing, fingerprint-based call answering, and the like.

The temperature sensor 1380J is configured to detect a temperature. In some embodiments, the electronic device 1300 executes a temperature processing policy based on the temperature detected by the temperature sensor 1380J. For example, when a temperature reported by the temperature sensor 1380J exceeds a threshold, the electronic device 1300 lowers performance of a processor located near the temperature sensor 1380J, to reduce power consumption and implement thermal protection. In some other embodiments, when the temperature is lower than another threshold, the electronic device 1300 heats the battery 1342, to avoid abnormal shutdown of the electronic device 1300 caused by a low temperature. In some other embodiments, when the temperature is lower than still another threshold, the electronic device 1300 boosts an output voltage of the battery 1342, to avoid abnormal shutdown caused by a low temperature.

The touch sensor 1380K is also referred to as a "touch component". The touch sensor 1380K may be disposed on the display 1394. The touch sensor 1380K and the display 1394 constitute a touchscreen, and the touchscreen is also referred to as a "touch control screen". The touch sensor 1380K is configured to detect a touch operation performed on or near the touch sensor. The touch sensor may transfer the detected touch operation to the application processor, to determine a type of a touch event. A visual output related to the touch operation may be provided by using the display 1394. In some other embodiments, the touch sensor 1380K may be alternatively disposed on a surface of the electronic device 1300, and is located on a position different from that of the display screen 1394.

The bone conduction sensor 1380M may obtain a vibration signal. In some embodiments, the bone conduction sensor 1380M may obtain a vibration signal of a vibration bone of a human vocal-cord part. The bone conduction sensor 1380M may also be in contact with a human pulse, and receive a blood pressure beating signal. In some embodiments, the bone conduction sensor 1380M may alternatively be disposed in a headset, to obtain a bone conduction headset. The audio module 1370 may obtain a voice signal through parsing based on the vibration signal that is of the vibration bone of the vocal-cord part and that is obtained by the bone conduction sensor 1380M, to implement a voice function. The application processor may parse heart rate information based on the blood pressure beating signal obtained by the bone conduction sensor 1380M, to implement a heart rate detection function.

The button 1390 includes a power button, a volume button, and the like. The button 1390 may be a mechanical button, or may be a touch button. The electronic device 1300 may receive a button input, and generate a button signal input related to user setting and function control of the electronic device 1300.

The motor 1391 may generate a vibration prompt. The motor 1391 may be configured to provide an incoming call vibration prompt or a touch vibration feedback. For example, touch operations performed on different applications (for example, photographing and audio playing) may correspond to different vibration feedback effects. The motor 1391 may also correspond to different vibration feedback effects for touch operations performed on different areas of the display 1394. Different application scenarios (for example, a time reminder, information receiving, an alarm clock, and a game) may also correspond to different vibration feedback effects. A touch vibration feedback effect may be further customized.

The indicator 1392 may be an indicator light, and may be configured to indicate a charging status and a power change, or may be configured to indicate a message, a missed call, a notification, and the like.

The SIM card interface 1395 is configured to connect to a SIM card. The SIM card may be inserted into the SIM card interface 1395 or removed from the SIM card interface 1395, to implement contact with and separation from the electronic device 1300. The electronic device 1300 may support one or N SIM card interfaces, where N is a positive integer greater than 1. The SIM card interface 1395 can support a Nano SIM card, a Micro SIM card, a SIM card, and the like. A plurality of cards may be inserted into a same SIM card interface 1395 at the same time. The plurality of cards may be of a same type or of different types. The SIM card interface 1395 may also be compatible with different types of SIM cards. The SIM card interface 1395 may also be compatible with an external memory card. The electronic device 1300 interacts with a network through a SIM card, to implement functions such as calling and data communication. In some embodiments, the electronic device 1300 uses an eSIM, that is, an embedded SIM card. The eSIM card may be embedded in the electronic device 1300, and cannot be separated from the electronic device 1300.

It should be understood that the electronic device 1300 shown in FIG. 13 can implement the processes of the methods provided in the embodiments shown in FIG. 3A to FIG. 11A of this application. Operations and/or functions of the modules in the electronic device 1300 are separately intended to implement corresponding procedures in the foregoing method embodiments. For details, refer to the descriptions in the method embodiments shown in FIG. 3A to FIG. 11A of this application. To avoid repetition, detailed descriptions are properly omitted herein.

It should be understood that the processor 1310 in the electronic device 1300 shown in FIG. 13 may be a system-on-a-chip SOC. The processor 1310 may include a central processing unit (Central Processing Unit, CPU), or may further include another type of processor, for example, a graphics processing unit (Graphics Processing Unit, GPU).

In conclusion, some processors or processing units in the processor 1310 may work together to implement the foregoing method procedure, and software programs corresponding to the processors or processing units may be stored in the internal memory 121.

This application further provides an electronic device, where the device includes a storage medium and a central processing unit. The storage medium may be a non-volatile storage medium, and the storage medium stores a computer executable program. The central processing unit is connected to the non-volatile storage medium, and executes the computer executable program to implement the methods provided in the embodiments shown in FIG. 3A to FIG. 11A of this application.

In the foregoing embodiments, the involved processor may include, for example, a CPU, a DSP, a microcontroller, or a digital signal processor, and may further include a GPU, an embedded neural-network process unit (Neural-network Process Units, NPU for short below), and an image signal processor (Image Signal Processing, ISP for short below). The processor may further include a necessary hardware accelerator or logic processing hardware circuit, for example, an ASIC, or one or more integrated circuits configured to control program execution in the technical solutions of this application. In addition, the processor may have a function of operating one or more software programs, and the software programs may be stored in a storage medium.

An embodiment of this application further provides a computer-readable storage medium. The computer-readable storage medium stores a computer program, and when the computer program is run on a computer, the computer is enabled to perform the methods provided in the embodiments shown in FIG. 3A to FIG. 11A of this application.

An embodiment of this application further provides a computer program product. The computer program product includes a computer program. When the computer program runs on a computer, the computer is enabled to perform the methods provided in the embodiments shown in FIG. 3A to FIG. 11A of this application.

In embodiments of this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists. A and B may be singular or plural. The character "/" generally indicates an "or" relationship between the associated objects. "At least one of the following items" or a similar expression thereof refers to any combination of these items, including any combination of singular items or plural items. For example, at least one of a, b, and c may represent: a, b, c, a and b, a and c, b and c, or a, b, and c, where a, b, and c may be singular or plural.

A person of ordinary skill in the art may be aware that units and algorithm steps described in embodiments disclosed in thus specification may be implemented by electronic hardware, or a combination of computer software and electronic hardware. Whether the functions are performed by hardware or software depends on a particular application and a design constraint condition that are of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, when any function is implemented in a form of a software functional unit and sold or used as an independent product, the function may be stored in a computer-readable storage medium. Based on such an understanding, the technical solutions of this application essentially, or the part that contributes to a current technology, or the part of the technical solutions may be embodied in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (Read-Only Memory, ROM for short below), a random access memory (Random Access Memory, RAM for short below), a magnetic disk, or an optical disc.

The foregoing descriptions are merely specific implementations of this application. Any variation or replacement readily figured out by a person skilled in the art within the technical scope disclosed in this application shall fall within the protection scope of this application. The protection scope of this application shall be subject to the protection scope of the claims.

What is claimed is:

1. A method, comprising:
displaying a multimedia file in non-full screen on an application interface of a display;
detecting an instruction for displaying the multimedia file in full screen;
displaying, when a window displaying the application interface comprises a graph whose aspect ratio is in a preset interval, the multimedia file in full screen in the window based on a current display direction of the application interface, wherein the current display direction of the application interface comprises a display direction of the application interface when the instruction for displaying the multimedia file in full screen is detected, and wherein the preset interval is an interval comprising 1;
detecting that an open-closed state of the display changes; and
displaying, based on the current display direction of the multimedia file and when a window displaying the multimedia file after the open-closed state changes comprises the graph whose aspect ratio is in the preset interval, the multimedia file in full screen in the window displaying the multimedia file, wherein the current display direction of the multimedia file comprises a display direction of the multimedia file obtained when detecting that the open-closed state of the display changes.

2. The method of claim 1, wherein the preset interval is [0.75, 4/3].

3. The method of claim 1,
wherein when a screen used by the window is a sub-screen, the window comprises the graph whose aspect ratio is in the preset interval, and
wherein when the screen used by the window is a complete screen, the window comprises the graph whose aspect ratio is not in the preset interval.

4. The method of claim 1,
wherein when a screen used by the window is a complete screen in an expanded state, the window comprises the graph whose aspect ratio is in the preset interval, and
wherein when the screen used by the window is a sub-screen in a folded state, the window comprises the graph whose aspect ratio is not in the preset interval.

5. The method of claim 1,
wherein when the open-closed state of the display is a folded state, the window comprises the graph whose aspect ratio is in the preset interval, and wherein when the open-closed state of the display is an expanded state, the window comprises the graph whose aspect ratio is not in the preset interval, or
wherein when the open-closed state of the display is an open-closed changing state and when a changing direction of the open-closed changing state of the display is from an expanded state to a folded state, the window comprises the graph whose aspect ratio is in the preset interval, and wherein when the open-closed state of the display is an open-closed changing state and when the changing direction is from a folded state to an expanded state, the window comprises the graph whose aspect ratio is not in the preset interval.

6. The method of claim 1,
wherein when the open-closed state of the display is an expanded state, the window comprises the graph whose aspect ratio is in the preset interval, and wherein when the open-closed state of the display is a folded state, that the window comprises the graph whose aspect ratio is not in the preset interval, or wherein when a changing direction of the open-closed state of the display is from a folded state to an expanded state, the window comprises the graph whose aspect ratio is in the preset interval, and wherein when the changing direction is from an expanded state to a folded state, the window comprises the graph whose aspect ratio is not in the preset interval.

7. The method of claim 1, wherein when a changing direction of an open-closed changing state of the display is from an expanded state to a folded state, the window displaying the multimedia file comprises the graph whose aspect ratio is in the preset interval, and wherein when the changing direction is from a folded state to an expanded state, the window displaying the multimedia file comprises the graph whose aspect ratio is not in the preset interval.

8. The method of claim 1, wherein when a changing direction of an open-closed changing state of the display is from a folded state to an expanded state, the window displaying the multimedia file comprises the graph whose aspect ratio is in the preset interval, and wherein when the changing direction is from an expanded state to a folded state, the window displaying the multimedia file comprises the graph whose aspect ratio is not in the preset interval.

9. The method of claim 1, wherein detecting the instruction for displaying the multimedia file in full screen comprises receiving a direction setting request from an application to which the application interface belongs when the application detects the instruction for displaying the multimedia file in full screen, and wherein the direction setting request carries a display direction specified by the application for the application interface.

10. The method of claim 9, wherein displaying the multimedia file in full screen in the window based on the current display direction of the application interface comprises:

modifying the display direction specified by the application in the direction setting request to the current display direction of the application interface; and displaying the multimedia file in full screen in the window based on a modified direction setting request.

11. An electronic device, comprising:

a memory configured to store one or more computer programs comprising instructions; and a processor coupled to the memory and configured to execute the instructions to cause the electronic device to:

display a multimedia file in non-full screen on an application interface of a display;

detect an instruction for displaying the multimedia file in full screen;

display, when a window displaying the application interface comprises a graph whose aspect ratio is in a preset interval, the multimedia file in full screen in the window based on a current display direction of the application interface, wherein the current display direction of the application interface comprises a display direction of the application interface when the instruction for displaying the multimedia file in full screen is detected, wherein the preset interval is an interval comprising 1;

detect that an open-closed state of the display changes; and display, based on the current display direction of the multimedia file and when a window displaying the multimedia file after the open-closed state changes comprises the graph whose aspect ratio is in the preset interval, the multimedia file in full screen in the window displaying the multimedia file, wherein the current display direction of the multimedia file comprises a display direction of the multimedia file obtained when detecting that the open-closed state of the display changes.

12. The electronic device of claim 11, wherein the preset interval is [0.75, 4/3].

13. The electronic device of claim 11, wherein the display configured to display the application interface is a foldable screen and does not perform split-screen display, wherein when a screen used by the window is a sub-screen, the window comprises the graph whose aspect ratio is in the preset interval, and wherein when the screen used by the window is a complete screen, the window comprises the graph whose aspect ratio is not in the preset interval.

14. The electronic device of claim 11, wherein the display configured to display the application interface is a foldable screen and does not perform split-screen display, wherein when a screen used by the window is a complete screen, the window comprises the graph whose aspect ratio is in the preset interval, and wherein when the screen used by the window is a sub-screen, that the window comprises the graph whose aspect ratio is not in the preset interval.

15. The electronic device of claim 11, wherein the display configured to display the application interface is a foldable screen and does not perform split-screen display, wherein when the open-closed state of the display is a folded state, the window comprises the graph whose aspect ratio is in the preset interval, and wherein when the open-closed state of the display is an expanded state, the window comprises the graph whose aspect ratio is not in the preset interval, or wherein when the changing direction is from an expanded state to a folded state, the window comprises the graph whose aspect ratio is in the preset interval, and wherein when the changing direction is from a folded state to an expanded state, the window comprises the graph whose aspect ratio is not in the preset interval.

16. The electronic device of claim 11, wherein the display configured to display the application interface is a foldable screen and does not perform split-screen display, wherein when the open-closed state of the display is an expanded state, the window comprises the graph whose aspect ratio is in the preset interval, and wherein when the open-closed state of the display is a folded state, that the window comprises the graph whose aspect ratio is not in the preset interval, or wherein when the open-closed state of the display is an open-closed changing state and when the changing direction is from a folded state to an expanded state, the window comprises the graph whose aspect ratio is in the preset interval, and wherein when the changing direction is from an expanded state to a folded state, the window comprises the graph whose aspect ratio is not in the preset interval.

17. The electronic device of claim 11, wherein the display does not perform split-screen display,
- wherein when the changing direction is from an expanded state to a folded state, the window displaying the multimedia file comprises the graph whose aspect ratio is in the preset interval, and
- wherein when the changing direction is from a folded state to an expanded state, the window displaying the multimedia file comprises the graph whose aspect ratio is not in the preset interval.

18. A non-transitory computer-readable storage medium, wherein the computer-readable storage medium stores a computer program that, when the computer program is executed by a processor, cause an apparatus to:
- display a multimedia file in non-full screen on an application interface of a display;
- detect an instruction for displaying the multimedia file in full screen;
- display, when a window displaying the application interface comprises a graph whose aspect ratio is in a preset interval, the multimedia file in full screen in the window based on a current display direction of the application interface, wherein the current display direction of the application interface comprises a display direction of the application interface when the instruction for displaying the multimedia file in full screen is detected, and wherein the preset interval is an interval comprising 1;
- detect that an open-closed state of the display changes; and
- display, based on a current display direction of the multimedia file and when a window displaying the multimedia file after the open-closed state changes comprises the graph whose aspect ratio is in the preset interval, the multimedia file in full screen in the window displaying the multimedia file, wherein the current display direction of the multimedia file comprises a display direction of the multimedia file obtained when detecting that the open-closed state of the display changes.

19. The non-transitory computer-readable storage medium of claim 18, wherein when a screen used by the window is a sub-screen, the window comprises the graph whose aspect ratio is in the preset interval, and wherein when the screen used by the window is a complete screen, the window comprises the graph whose aspect ratio is not in the preset interval.

20. The non-transitory computer-readable storage medium of claim 18, wherein the display configured to display the application interface is a foldable screen and does not perform split-screen display, wherein when a screen used by the window is a complete screen, the window comprises the graph whose aspect ratio is in the preset interval, and wherein when the screen used by the window is a sub-screen, the window comprises the graph whose aspect ratio is not in the preset interval.

* * * * *